United States Patent [19]
Adachi

[11] Patent Number: 6,018,642
[45] Date of Patent: *Jan. 25, 2000

[54] RADIO COMMUNICATIONS SYSTEM, BASE STATION FOR RADIO COMMUNICATIONS SYSTEM, AND INTERMITTENT POWER-ON TYPE MOBILE STATION

[75] Inventor: Hideo Adachi, Yokohama, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/658,865

[22] Filed: May 31, 1996

[30]     Foreign Application Priority Data

Dec. 8, 1995   [JP]   Japan ...................................... 7-320704

[51] Int. Cl.[7] ...................................................... H04B 7/26
[52] U.S. Cl. .......................... 455/38.3; 455/70; 455/517; 455/561; 455/574; 370/311
[58] Field of Search ..................................... 455/38.3, 343, 455/574, 70, 72, 561, 517, 526, 38.1, 31.2, 32.1, 464, 502; 370/311; 340/825.44, 311.1

[56]               References Cited

U.S. PATENT DOCUMENTS

| | | | |
|---|---|---|---|
| 4,449,248 | 5/1984 | Leslie et al. ............................. | 455/343 |
| 5,128,938 | 7/1992 | Borras ..................................... | 370/311 |
| 5,276,680 | 1/1994 | Messenger ............................. | 455/38.3 |
| 5,373,506 | 12/1994 | Tayloe et al. ........................... | 370/311 |
| 5,535,207 | 7/1996 | Dupont .................................. | 455/38.3 |
| 5,629,940 | 5/1997 | Gaskill ................................... | 370/311 |

FOREIGN PATENT DOCUMENTS

| | | |
|---|---|---|
| 61-35644 | 2/1986 | Japan . |
| 63-77240 | 4/1988 | Japan . |
| 1-221934 | 9/1989 | Japan . |

*Primary Examiner*—Reinhard J. Eisenzopf
*Assistant Examiner*—Lester G. Kincaid
*Attorney, Agent, or Firm*—Armstrong, Westerman, Hattori, McLeland & Naughton

[57]               ABSTRACT

A radio communications system such as a radio local area network including a base station and mobile stations. The radio communications system includes an intermittent power-on type mobile station for shifting automatically to a power-on state synchronously with a received timing of a beacon signal, with a fixed period of time after the beacon signal has been received being a data receive-ready period; and a base station for emanating a beacon signal to the intermittent power-on type mobile station and communicating with the intermittent power-on type mobile station by radio while the intermittent power-on type mobile station is controlled. The base station preferentially transmits data to a normal mobile station in a normally power-on state when the data to be transmitted to the intermittent power-on type mobile station exists during the data receive-ready period of the intermittent power-on type mobile station. The radio communications system can realize improved throughput and power-saving.

10 Claims, 22 Drawing Sheets

RADIO COMMUNICATIONS SYSTEM, BASE STATION FOR RADIO COMMUNICATIONS SYSTEM, AND INTERMITTENT POWER-ON TYPE MOBILE STATION

BACKGROUND OF THE INVENTION

1. Field of the Invention

The present invention relates to a radio communications system, a base station for a radio communications system, and an intermittent power-on type mobile station each of which is particularly suitable for in radio local area networks (LANs).

2. Description of the Related Art

FIG. 21 is a block diagram showing a communications model in which a radio LAN is applied as a general radio communications system. Referring to FIG. 21, the radio LAN 100 is formed of a plurality of radio terminals 102 and a base station 101 accommodating radio terminals 102 covered in a radio area 103. Communications is established between two radio terminals 102 by connecting via a radio network in a cableless state.

The base station 101 in each of a plurality of radio LANs 100 is connected to the cable network 104 accommodating cable terminals 105. The radio terminals 102 can communicate with cable network 104 or terminals (radio terminals 102 or cable terminals 105) on the radio network via the base station 101.

The base station 101 emanates regularly a synchronous beacon signal to a radio terminal 102 to synchronize with the radio terminal 102 and to control the same.

The radio terminal 102 can be used as a portable, mobile terminal. However, it is required that the power consumption of the radio terminal 102 acting as a mobile terminal reduced.

The general radio LAN 100 shown in FIG. 21 has a control mode in which the mobile station (radio terminal) 102 is intermittently powered on under the control of the base station 101 to achieve its power-saving operation.

That is, data transmission information (terminal information to a transmission destination) which is transmitted to a radio terminal (PS Power Save) station) 102 to be operated in a power-saving mode is added regularly to a specific one among beacon signals emanated from the base station 101.

For example, as shown with the timechart in FIG. 22, the base station 101 outputs beacon signals (refer to symbols "○" and "◎") at predetermined intervals (refer to the time (t1), (t2), . . . , (t5). Data transmission information which is transmitted to the mobile terminal 102 controlled to operate in a power-saving mode is added to the beacon signal (refer to "◎") output every third interval among the abovementioned beacon signals (refer to the time (t1) and (t4)).

In the mobile station 102 acting as a transmission destination terminal which receives a power-saving control beacon signal from the base station 101, the period during which the next beacon signal is received is used as a data receive-ready period (receivable period) from the base station 101 and is controlled so as to be powered on only the period (refer to the time (t1) and (t2) and the time (t4) and (t5)).

The power-saving control beacon signal (e.g., at the time (t1)) includes timing information regarding the power-saving control beacon signal to be transmitted next. The radio unit 102 acting as a PS station is powered on so as to receive the next power-saving control beacon signal (at the time (t4)), based on the timing information.

That is, the radio unit 102 acting as a PS station is powered on at the timing when the power-saving control beacon signal can be received. On the other hand, when there is data for a self station, the data is received based on the data transmission information included in a beacon signal. When there is no data for a self station, the power consumption is saved by turning off the power supply in the period during which no data is received.

The radio terminal (PS station) 102 corresponding to data transmission information included in a beacon signal (referred to the symbol "◎") from the base station 101 is controlled to realize the power-saving operation (hereinafter the beacon signal represented with the symbol "◎" is referred to as a power-saving control beacon signal).

The base station 101 is in a data transmit-ready state to the radio terminal (CA (Continuous Active) station) 102 which does not operate in a power-saving mode during the period between the time a beacon signal (symbol "○") for no power-saving control is output and the time the next beacon signal is transmitted (the time (t2) to (t4). At the same time, the mobile terminal 102 which operates in a power-saving mode is powered off, whereby no data is received.

Referring to FIG. 22, numerals represent the order in which transmission requests occur and arrows show data flows (mobile station acting as destination). Data are transmitted basically in numerical order (the order in which a transmission request occurs).

Data is transmitted to the radio terminal (PS station) 102 only during the data receive-ready period of the radio terminal (PS station) 102. Hence even if a transmission request occurs early, data beyond the limit in a period is forwarded to the next transmission timing. For that reason, transmission data to be transmitted to the intermittent power-on type mobile station 13 is buffered to memories (refers to numerals 33 and 34) in the base station 101 and becomes a transmission waiting state.

In such a configuration, the base station 101 powers on the mobile terminal 102 acting as a PS station only during the data transmission period (refer to the time (t1) and (t2) and the time (t4) to (t5), synchronously with the beacon signal which is emanated from the base station 101 accommodating a radio area corresponding to the position of the mobile station 102 itself. This operation allows checking the information regarding the presence or absence of transmission data sent to the self station included in a received beacon signal.

The mobile station 102 receives data for the self station. However, if there is no data for the self station, the power consumption can be reduced by turning off the power supply until the next predetermined receiving time.

For example, according to the data transmission information included in the beacon signal received at the time (t1) shown in FIG. 22, the radio terminal (PS1) 102 acting as the first PS station receives data "1" and the radio terminal (PS2) 102 acting as the second PS station receives data "2".

Similarly, according to data transmission information included in the beacon signal received at the time (t4), the radio terminal (PS1) 102 receives "8" and the radio terminal (PS2) 102 acting as the second PS station receives "5").

In the timechart shown in FIG. 22, numeral information attached to the data transmitted from the base station 101 to the mobile station 102 represents the order of a transmission request in the base station 101. Data is transmitted according to the numeral information other (the transmission data "5" and "8" are data for a PS station and are delayed compared with data "6", "7", . . . "11" for CA stations (CA1 and CA2) transmitted at the time (t2) to (t4)).

However, in the radio LAN acting as the above-mentioned radio communications system, the number of mobile stations 102 each acting as a PS station among the mobile terminals 102 connected to the base station 101 and the number of CA stations are indefinite. Moreover, the amount of data transmission and the timing to the mobile terminal 102 from the base station 101 are indefinite. There is the problem in that the method in which the mobile terminal 102 allocates the period during which data can be received from the base station 101 according to beacon signals sent at constant intervals cannot be dealt with in the above-mentioned manner.

That is, generally, where the interval during which the PS station can receive the power-saving operational beacon signals is set narrowly to improve the flow of transmission data and the throughput, the frequency at which the mobile terminal 102 acting as a PS station is powered on becomes large, whereby the power consumption on the side of the mobile station 102 is increased.

When the interval at which the above-described power-saving operational beacon signal is transmitted is set widely to reduce the power consumption, the flow of transmission data is reduced on the side of the base station 101, whereby the throughput is reduced.

Moreover, as shown in FIG. 23, when up-stream data "A" transmitted from the mobile station 102 to the base station 101 occurs in the receive-ready period (refer to the time (s1) and (s2) during which the mobile station 102 acting as a PS station can receive data signals from the base station 101 after a transmission of the power-saving control beacon signal at the time (s1), data (data "3") to be transmitted cannot be received in the receive-ready period. As a result, there is the problem in that the throughput is decreased.

SUMMARY OF THE INVENTION

The present invention is made to overcome the above-mentioned problems. An object of the present invention is to provide a radio communications system that varies the interval between beacon signals and transmits data with priority to a mobile station so that an improved throughput and power-saving can be realized.

Another object of the present invention is to provide a base station for a radio communications system that varies the interval between beacon signals and transmits data with priority to a mobile station so that an improved throughput and power-saving can be realized.

Still another object of the present invention is to provide an intermittent power-on type mobile station that varies the interval between beacon signals and transmits data with priority to a mobile station so that an improved throughput and power-saving can be realized.

In order to achieve the above objects, according to the present invention, the radio communications system is characterized by an intermittent power-on type mobile station for shifting in a power-on state synchronously with a receiving timing of a beacon signal, with a fixed period of time after the beacon signal has been received being a data receive-ready period; and a base station for emanating regularly a beacon signal to the intermittent powered-on type mobile station and communicating with the intermittent power-on type mobile station by radio while the intermittent power-on type mobile station is controlled; the base station preferentially transmitting data to a normal mobile station in a normally powered-on state when the data to be transmitted to the intermittent power-on type mobile station exists during the data receive-ready period of the intermittent power-on type mobile station.

Hence, according to the present invention, since the base station preferentially transmits data to a normal mobile station in a normally powered-on state when the data to be transmitted to the intermittent power-on type mobile station exists during the data receive-ready period of the intermittent power-on type mobile station, the power consumption of the intermittent power-on type mobile station is reduced in a power-saving mode while the throughput transmitted from the base station to the intermittent power-on type mobile station can be improved. As a result, there is an advantage in that the load can be reduced when the base station buffers data to the intermittent power-on type mobile station.

According to the present invention, the radio communications system is characterized by an intermittent power-on type mobile station for shifting in a power-on state synchronously with a receiving timing of a beacon signal, with a fixed period of time after the beacon signal has been received being a data receive-ready period; and a base station for emanating a beacon signal to said intermittent power-on type mobile station at regular intervals and for communicating with the intermittent power-on type mobile station by radio while the intermittent power-on type mobile station is controlled; the base station reporting as time extension information that data must be received beyond the data receive-ready period, to the intermittent power-on type mobile station, when the data is transmitted continuously beyond the data receive-ready period of the intermittent power-on type mobile station; the intermittent power-on type mobile station sustaining its powered-on state until all pieces of data transmitted continuously from the base station are received when the intermittent power-on type mobile station has received the time extension information from the base station.

According to the present invention, the base station reports as time extension information that data must be received beyond the data receive-ready period, to the intermittent power-on type mobile station, when the data is transmitted continuously beyond the data receive-ready period of the intermittent powered-on mobile station; and the intermittent power-on type mobile station sustains its powered-on state until all pieces of data transmitted continuously from the base station are received when the intermittent power-on type mobile station has received the time extension information from the base station. Hence, the above-mentioned advantage can be obtained similarly. In addition, particularly, this configuration can transmit continuously data to a single intermittent power-on type mobile station, thus contributing to a greatly-improved throughput of the intermittent power-on type mobile station.

Moreover, according to the present invention, the radio communications system is characterized by an intermittent power-on type mobile station for shifting in a power-on state synchronously with a receiving timing of a beacon signal, with a fixed period of time after the beacon signal has been received being a data receive-ready period; and a base station for emanating a beacon signal to the intermittent power-on type mobile station at regular intervals and communicating with the intermittent power-on type mobile station by radio while the intermittent power-on type mobile station is controlled; the base station previously reporting transmission information regarding data to be transmitted to the intermittent power-on type station during the data receive-ready period of the intermittent power-on type mobile station, to the intermittent power-on type mobile station, and transmitting the data within a predetermined period of time after a completion of the data receive-ready period when the data included in said transmission data cannot be transmitted during the data receive-ready period; the intermittent power-on type mobile station sustaining its powered-on state when data included the transmission data previously reported from the base station, and then extending the data receive-ready period by the predetermined period of time.

According to the present invention, the base station previously reports transmission information regarding data to be transmitted to the intermittent power-on type mobile station during the data receive-ready period of the intermittent power-on type mobile station, to the intermittent power-on type mobile station, and transmits the data within a predetermined period of time after a completion of the data receive-ready period when the included in said transmission data cannot be transmitted during the data receive-ready period; and the intermittent power-on type mobile station sustains its powered-on state when the data included in the transmission data previously reported from the base station, and then extends the data receive-ready period by the predetermined period of time. Hence, like the above-mentioned case, the throughput transmitted from intermittent power-on type mobile station to the base station can be improved by effectively using the power consumption of the intermittent power-on type mobile station which is standing by in a receiving state and reducing the power consumption of the intermittent power-on type mobile station in a power-saving mode. As a result, there is the advantage in that the load can be reduced when the base station buffers data to the intermittent power-on type mobile station.

Furthermore, according to the present invention, the radio communications system is characterized by an intermittent power-on type mobile station for shifting in a power-on state synchronously with a receiving timing of a beacon signal, with a fixed period of time after the beacon signal has been received being a data receive-ready period; and a base station for emanating a beacon signal to the intermittent power-on type mobile station at regular intervals and communicating with the intermittent power-on type mobile station by radio while the intermittent power-on type mobile station is controlled; the base station varying the interval at which the beacon signal is emanated to the intermittent powered-on type mobile station according to a transmission data amount to the intermittent powered-on type mobile station; the intermittent power-on type station varying the beacon signal receiving timing which shifts to its powered-on state, according to the emanating interval.

According to the present invention, since the base station varies the interval at which the beacon signal is emanated to the intermittent power-on type mobile station according to an amount of transmission data transmitted to the intermittent power-on type mobile station, and the intermittent power-on type station varies the beacon signal receiving timing which shifts to its powered-on state, according to the emanating interval. Hence, there is the advantage in that the power consumption of the intermittent power-on type mobile station which in a power-saving mode as well as the throughput transmitted from the base station to the intermittent power-on type mobile station can be adjusted most suitably according to the amount of transmission data transmitted from the base station to the intermittent power-on type mobile station.

According to the present invention, in the base station of a radio communications system wherein the base station emanates a beacon signal to an intermittent power-on type mobile station at regular intervals and communicates with the intermittent power-on type mobile station by radio in which the intermittent power-on type mobile station is controlled in the radio communications system, the communications system accommodating the intermittent power-on type mobile station which shifts to its powered-on state in synchronous with a receiving timing of the beacon signal, with a constant period of time after a reception of the beacon signal being a data receive-ready period, the base station is characterized by a priority transmitting means for preferentially transmitting the data over transmission data to a normal mobile station in a normally powered-on state when the data to be transmitted to the intermittent power-on type mobile station exists during the data receive-ready period of the intermittent power-on type mobile station.

Hence, according to the present invention, since the base station preferentially transmits the data over transmission data to a normal mobile station in a normally powered-on state when the data to be transmitted to the intermittent power-on state mobile station exists during the data receive-ready period of the intermittent power-on type mobile station, the power consumption of the intermittent power-on type mobile station is reduced in a power-saving mode while the throughput transmitted from the base station to the intermittent power-on type mobile station can be improved. As a result, there is an advantage in that the load can be reduced when the base station buffers data to the intermittent power-on type mobile station.

Furthermore, according to the present invention, in the base station in a radio communications system wherein the base station emanates a beacon signal to an intermittent power-on mobile station at regular intervals and communicates with the intermittent power-on type mobile station by radio in which the intermittent power-on type mobile station is controlled in the radio communications system, the communications system accommodating the intermittent power-on type mobile station which shifts to its powered-on state synchronously with a receiving timing of the beacon signal, with a constant period of time after a reception of the beacon signal being a data receive-ready period, the base station is characterized by time extension reporting means for reporting as time extension information that data must be received beyond the data receive-ready period, to the intermittent power-on type mobile station when data is transmitted continuously beyond the data receive-ready period of the intermittent power-on type mobile station.

Hence, according to the present invention, the base station reports as time extension information that data must be received beyond the data receive-ready period, to the intermittent power-on type mobile station when data is transmitted continuously beyond the data receive-ready period of the intermittent power-on type mobile station while the intermittent power-on type mobile station can extend the data receive-ready period by sustaining the powered-on state until all pieces of data transmitted continuously from the base station are received in response to the time extension information from the base station. Hence, the base station has the above-mentioned advantage. In addition, continuously transmitting data to one intermittent power-on type mobile station contributes to greatly improving the throughput of the intermittent power-on type mobile station.

According to the present invention, the base station in a radio communications system wherein the base station emanates a beacon signal to an intermittent power-on type mobile station at regular intervals and communicates with the intermittent power-on type mobile station by radio in which the intermittent power-on type mobile station is controlled in the radio communications system, the communications system accommodating the intermittent power-on type mobile station which shifts to its powered-on state synchronously with a receiving timing of said beacon signal, with a constant period of time after a reception of the beacon signal being a data receive-ready period, the base station is characterized by transmission information reporting means for previously reporting transmission data regarding data to be transmitted to the intermittent power-on type mobile station, to the intermittent power-on type mobile station, during the data receive-ready period of the intermittent power-on type mobile station; and overtime transmitting means for transmitting the data within a predetermined period of time after a completion of the data receive-ready period when data included in the transmission information cannot be transmitted during the data receive-ready period.

Hence, according to the present invention, the base station previously reports transmission data regarding data to be transmitted to the intermittent power-on type mobile station, to the intermittent power-on type mobile station, during the data receive-ready period of the intermittent power-on type mobile station and transmits the data within a predetermined period of time after a completion of the data receive-ready period when data included in the transmission information cannot be transmitted during the data receive-ready period. The intermittent power-on mobile station can extend the data receive-ready period by a predetermined time by sustaining the powered-on state when data included previously from the base station is not received during a data receive-ready period. Hence, the throughput transmitted from the base station to the intermittent power-on type mobile station can be improved by using effectively the power consumption of the intermittent power-on type mobile station which is standing by in a receivable state and suppressing the power consumption of the intermittent power-on type mobile station in a power-saving state. As a result, the load that the base station buffers data to the intermittent power-on type mobile station can be reduced advantageously.

Furthermore, according to the present invention, the base station in a radio communications system wherein the base station emanates a beacon signal to an intermittent power-on mobile station at regular intervals and communicates with the intermittent power-on type mobile station by radio which the intermittent power-on type mobile station is controlled in the radio communications system, the communications system accommodating the intermittent power-on type mobile station which shifts to its powered-on state synchronously with a receiving timing of the beacon signal, with a constant period of time after a reception of said beacon signal being a data receive-ready period, the base station is characterized by beacon signal emanation interval varying means for varying the interval at which the beacon signal is emanated to the intermittent power-on type mobile station according to an amount of transmission data of the intermittent power-on type mobile station.

According to the present invention, the base station varies the interval at which the beacon signal is emanated to the intermittent power-on type mobile station according to an amount of transmission data of the intermittent power-on type mobile station and the intermittent power-on type mobile station can vary the beacon signal receiving timing shifted to a powered-on state. Hence, the power consumption of the intermittent power-on type mobile station in a power-saving state can be adjusted most suitably according to the transmission data amount transmitted from the base station to the intermittent power-on type mobile station.

According to the present invention, the intermittent power-on type mobile station which shifts to its powered-on state synchronously with a receiving timing of a beacon signal emanated from a base station at regular intervals, with a constant period after a reception of the beacon signal being a data receive-ready period, is characterized by power supply control means for sustaining its powered-on state until all pieces of data continuously transmitted from the base station when time extension information regarding that data must be received beyond the data receive-ready period has been received from the base station, and then extending the data receive-ready period.

According to the present invention, the base station reports as time extension information that data must be received beyond the data receive-ready period, to the intermittent power-on type mobile station, when data is continuously transmitted beyond the data receive-ready period of the intermittent power-on type mobile station. The intermittent power-on type mobile station can extend the data receive-ready period by sustaining the powered-on state until all pieces of data are continuously received from the base station, in response to time extension information from the base station. Hence, the above-mentioned advantage can be obtained. Moreover, particularly, data can be transmitted continuously to one intermittent power-on type mobile station so that the throughput of the intermittent power-on type mobile station can be improved greatly.

Furthermore, according to the present invention, the intermittent power-on type mobile station which shifts to its powered-on state synchronously with a receiving timing of a beacon signal emanated from a base station at regular intervals, with a constant period after a reception of the beacon signal being a data receive-ready period, is characterized by power supply control means for previously reporting transmission information regarding data to be transmitted from the base station during the data receive-ready period, from the base station, and then sustaining its powered-on state when data included in the transmission information cannot be received during the data receive-ready period to extend the data receive-ready period by a predetermined period of time.

According to the present invention, the base station previously reports transmission information regarding data transmitted to the intermittent power-on type mobile station to the intermittent power-on type mobile station during the data receive-ready period of the intermittent power-on type mobile station and transmits data in a predetermined period after the completion of the data receive-ready period when data included in the transmission information cannot be received during the data receive-ready period. The intermittent power-on type mobile station can extend the data receive-ready period by a predetermined time by sustaining the powered-on state when data included in transmission information previously reported from the base station. Hence, like the above-mentioned case, the throughput transmitted from the base station to the intermittent power-on type mobile station can be improved by effectively using the power consumption of the intermittent power-on type mobile station which is standing by in a receiving state and reducing the power consumption of the intermittent power-on type mobile station in a power-saving state. As a result, the load that the base station buffers data to the intermittent power-on type mobile station can be reduced.

Moreover, according to the present invention, the intermittent power-on type mobile station which shifts to its power-on state synchronously with a receiving timing of a beacon signal emanated from a base station at regular intervals, with a constant period after a reception of the beacon signal being a data receive-ready period, is characterized by beacon signal receiving timing varying means for varying the beacon signal receiving timing which shifts to its powered-on state according to the emanating interval when the emanating interval of the beacon signal is varied according to an amount of transmission data in the base station.

Hence, according to the present invention, the base station varies the interval at which a beacon signal is emanated to the intermittent power-on type mobile station according to the amount of transmission data transmitted to the intermittent power-on type mobile station and the intermittent power-on type mobile station can vary the beacon signal receiving timing which is shifted to the powered-on state according to the emanation interval. Hence, there is the advantage in that the power consumption of the intermittent power-on type mobile station in a power-saving state is reduced as well as the throughput transmitted from the base station to the intermittent power-on type mobile station can be adjusted most suitably according to the transmission data amount transmitted from the base station to the intermittent power-on type mobile station.

DESCRIPTION OF THE PREFERRED EMBODIMENTS (a) Aspect of the Invention

First, an aspect of the present invention will be explained by referring to the attached drawings.

Figure 1:
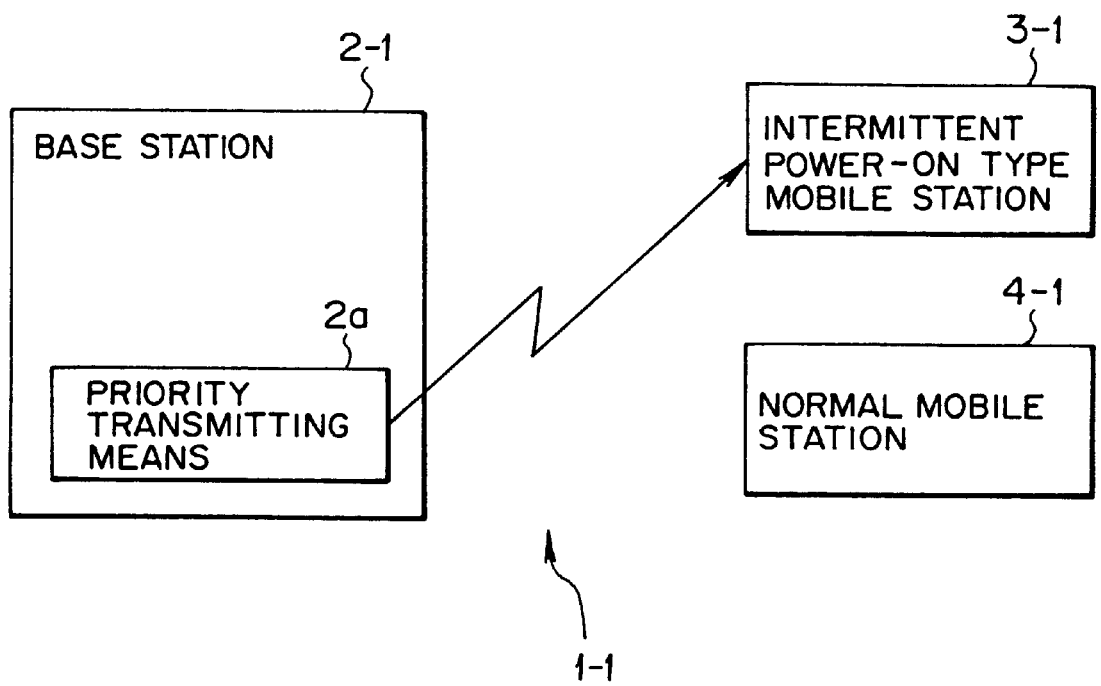
FIG. 1 is a block diagram showing an aspect of the present invention.

FIG. 1 is a block diagram illustrating an aspect of the present invention. Referring to FIG. 1, numeral 1-1 represents a radio communications system. The radio communications system 1-1 consists of an intermittent power-on type mobile station 3-1 which sets a predetermined period of time as a data receive-ready period and a normal mobile station 4-1, and a base station 2-1 which communicates with the intermittent power-on type mobile station 3-1 by means of radio.

The base station 2-1 includes priority transmitting means 2a that emanates regularly a beacon signal to the intermittent power-on mobile station 3-1 and communicates with it under control.

Furthermore, the intermittent power-on type intermittent mobile station 3-1 shifts its powered-on state, in synchronous with the receiving timing of a beacon signal from the base station 2-1, and sets as a data receive-ready period a constant period of time after receiving a beacon signal as a data receive-ready period.

That is, when there is data to be transmitted to the intermittent powered-on type mobile station 3-1 during the data receive-ready period of the intermittent power-on type mobile station 3-1, the priority transmitting means 2a transmits the data preferentially to transmission data to the normal mobile station 4-1 in normally-powered-on state.

In the radio communications system 1-1 with the above-mentioned configuration according to the present invention, the base station 2-1 emanates regularly a beacon signal to the intermittent power-on type mobile station 3-1. However, the intermittent power-on type mobile station 3-1 shifts its powered-on state in synchronous with the receiving timing of the beacon signal from the base station 2-1. This feature allows performing radio communications between the base station 2-1 and the intermittent power-on type mobile station 3-1.

When there is data to be transmitted to the intermittent power-on type mobile station 3-1 during the data receive-ready period of the intermittent power-on type mobile station 3-1, the priority transmitting means 2a in the base station 2-1 transmits preferentially the data in comparison with transmission data to be transmitted to the normal mobile station 4-1 in a normally-powered-on state.

Figure 2:
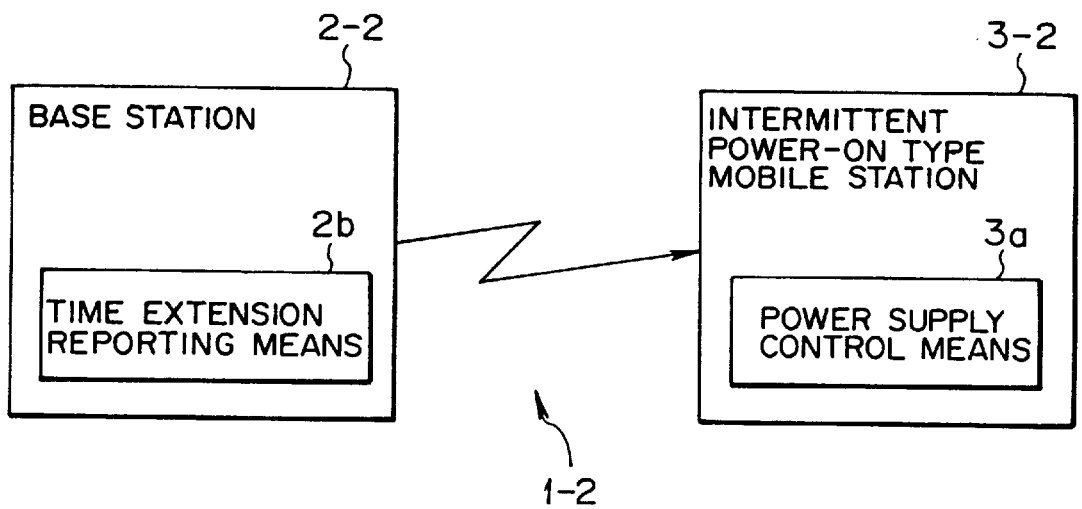
FIG. 2 is a block diagram showing an aspect of the present invention.

FIG. 2 is a block diagram illustrating an aspect of the present invention. Referring to FIG. 2, numeral 1-2 represents a radio communications system. The radio communications system 1-2 accommodates an intermitted power-on type mobile station 3-2 and is constituted of a base station 2-2 which communicates with the intermittent power-on type mobile station 3-2 by radio.

The base station 2-2 emanates regularly a beacon signal to the intermittent power-on type mobile station 3-2 and controls the intermittent power-on type mobile station 3-2 to communicate with the same. The base station 2-2 includes time extension reporting means 2b.

Moreover, the intermittent power-on type mobile station 3-2 shifts to its powered-on state in synchronous with the receiving timing of the beacon signal and then sets as a data receive-ready period a predetermined period after receiving the beacon signal. The intermittent power-on type mobile station 3-2 includes power supply control means 3a.

When data is transmitted continuously beyond the data receive-ready period of the intermittent power-on type mobile station, the time extension reporting means 2b in the base station 2-2 reports as time extension information that data must be received beyond the data receive-ready period, to the intermittent power-on type mobile station 3-1.

When receiving time extension information regarding that data must be received beyond the data receive-ready period, the power supply control means 3a in the intermittent power-on type mobile station 3-2 extends the data receive-ready period by sustaining its powered-on state until all pieces of data continuously transmitted from the base station 2-2.

Like the above-mentioned radio communications system 1-2, the radio communications system with the above-mentioned configuration according to the present invention establishes radio communications between the base station 2-2 and the intermittent power-on type mobile station 3-2.

In the base station 2-2, when data is transmitted continuously beyond the data receive-ready period, the base station 2-2, the time extension reporting means 2b reports time extension information regarding that data must be received beyond the data receive-ready period, to the intermittent power-on type mobile station 3-2. When receiving the time extension information from the base station 2-2, the power supply control means 3a in the intermittent power-on type mobile station 3-2 extends the data receive-ready period by sustaining its powered-pm state until all pieces of data transmitted continuously from the base station 2-2.

Figure 3:
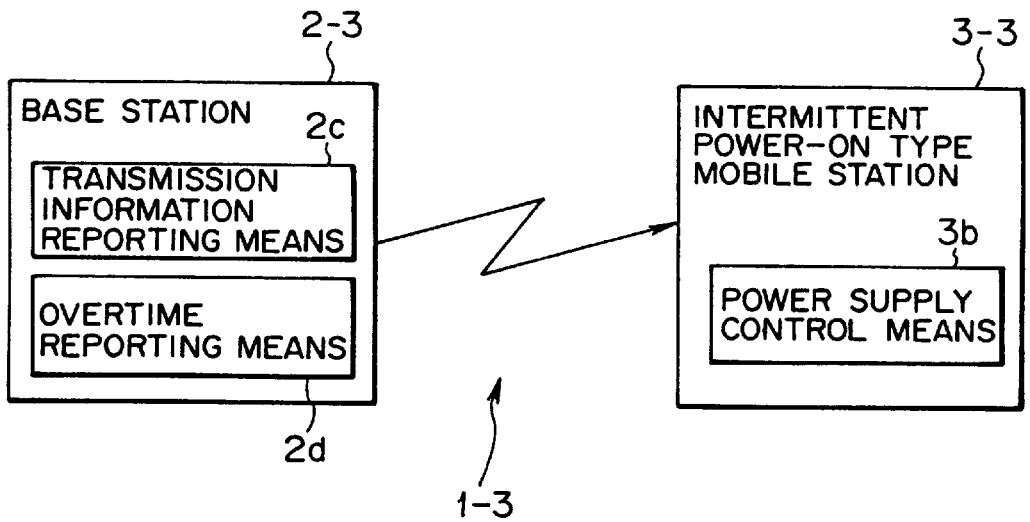
FIG. 3 is a block diagram showing an aspect of the present invention.

FIG. 3 is a block diagram illustrating an aspect of the present invention. Referring to FIG. 3, numeral 1-3 represents a radio communications system. The radio communications system 1-3 accommodates the intermittent power-on type mobile station 3-3 and includes a base station 2-3 which communicates with the intermittent power-on type mobile station 3-3 by means of radio.

The base station 2-3 emanates regularly a beacon signal to the intermittent power-on type mobile station 3-3, thus communicating with the intermittent power-on type mobile station 3-3 by means of radio, while the intermittent power-on type mobile station 3-3 is controlled. The base station 2-3 includes transmission information reporting means 2c and time extension transmitting means 2d.

Moreover, the intermittent power-on type mobile station 3-3 shifts to its powered-on state in synchronous with the receiving timing of the beacon signal and sets as a data receive-ready period the constant period after receiving the beacon signal. The intermittent power-on type mobile station 3-3 includes power supply control means 3b.

In the base station 2-3, the transmission information reporting means 2c reports previously transmission information regarding data transmitted to the intermittent power-on type mobile station 3-3 during the data receive-ready period of the intermittent power-on type mobile station 3-3 to the intermittent power-on type mobile station 3-3 and the overtime reporting means 2d transmits data within a predetermined period of time after completion of the data receive-ready period when data included in the transmission information cannot be transmitted during the data receive-ready period.

In the intermittent power-on type mobile station 3-3, the power supply control means 3b receives transmission information regarding data transmitted from the base station 2-3 during the data receive-ready period, the transmission information being reported previously from the transmission reporting means 2c in the base station 2-3, and sustains its powered-on state when data included in the transmission information is not received during the data receive-ready period so that the data receive-ready period is extended by a predetermined time. The power supply can be turned off at a time when all pieces of data included in transmission information have been received within a predetermined period after the data receive-ready period has been passed.

Like the radio communications system 1-1, in the radio communications system 1-3 with the above-mentioned configuration according to the present invention, radio communications between the base station 2-3 and the intermittent power-on type mobile station 3-3 can be established.

That is, in the base station 2-3, the transmission information reporting means 2c previously reports transmission information regarding data to be transmitted to the intermittent power-on type mobile station 3-3 during the data receive-ready period of the intermittent power-on type mobile station 3-3, to the intermittent power-on type mobile station 3-3, and the time extension reporting means 2d transmits data within a predetermined time after a completion of the data receive-ready period when data included in the transmission information cannot be transmitted during the data receive-ready period.

In the intermittent power-on type mobile station 3-3, when data included in the transmission information previously reported from the base station 2-3 is not be received during the data receive-ready period, the power supply control means 3b sustains its powered-on state, thus extending the data receive-ready period by a predetermined time. The power supply control means 3b shifts to a power supply turn-off state at the time when all pieces of data included in transmission data within a predetermined time after completion of the data receive-ready period.

Figure 4:
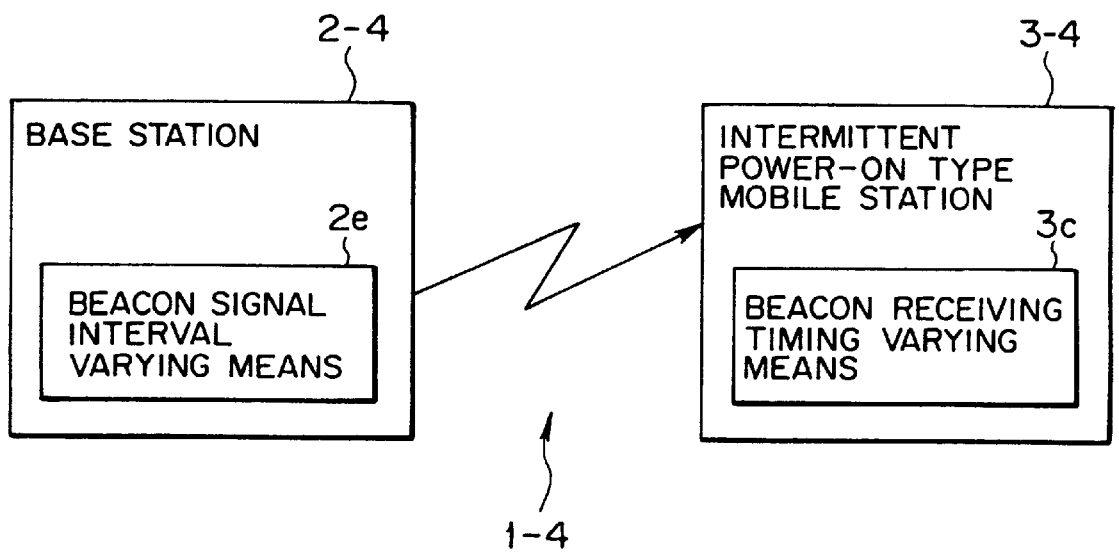
FIG. 4 is a block diagram showing an aspect of the present invention.

FIG. 4 is a block diagram illustrating an aspect of the present invention. Referring to FIG. 4, numeral 1-4 represents a radio communications system. The radio communications system 1-4 accommodates an intermittent power-on type mobile station 3-4 and is constituted of a base station 2-4 which communicates with the intermittent power-on type mobile station 3-4 by radio.

The base station 2-4 regularly emanates a beacon signal to the intermittent power-on type mobile station 3-4 and communicates controllably with the intermittent power-on type mobile station 3-4. The base station 2-4 includes signal emanation interval varying means 2e.

Moreover, the intermittent power-on type mobile station 3-4 shifts to its powered-on state synchronously with the receiving timing of a beacon signal to set as data receive-ready period the constant period after receiving the beacon signal. The intermittent power-on type mobile station 3-4 includes beacon signal receiving timing varying means 3c.

In the base station 2-4, the beacon signal emanation interval varying means 2e varies the emanation interval of a beacon signal transmitted to the intermittent power-on type mobile station 3-4, according to the transmission data amount transmitted to the intermittent power-on type mobile station 3-4.

In operation, the beacon signal emanation interval varying means 2e can narrow the emanation interval when the transmission amount increases, but can widen the emanation interval when the transmission amount decreases.

The beacon signal receive timing varying means 3c varies the beacon signal receiving timing shifted to the power-on state according to the emanation interval when the beacon signal emanation interval varying means 2e in the base station 2-4 varies the emanation interval of a beacon signal according to the transmission data amount.

Like the radio communications system 1-1, the radio communications system 1-4 with the above-mentioned configuration according to the present invention can establish radio communications between the base station 2-4 and the intermittent power-on type mobile station 3-4.

The beacon signal emanation interval varying means 2e varies the emanation interval of a beacon signal to the intermittent power-on type mobile station 3-4 in the base station 2-4 according to the transmission data amount to the intermittent power-on type mobile station 3-4. The beacon signal receive timing varying means 3c in the intermittent power-on type mobile station 3-4 varies the beacon signal receive timing shifted to the powered-on state according to the emanation interval.

In operation, the beacon signal receive timing varying means 3c narrows the emanation interval when the transmission data amount increases, but widens the emanation interval when the transmission data amount decreases.

Figure 5:
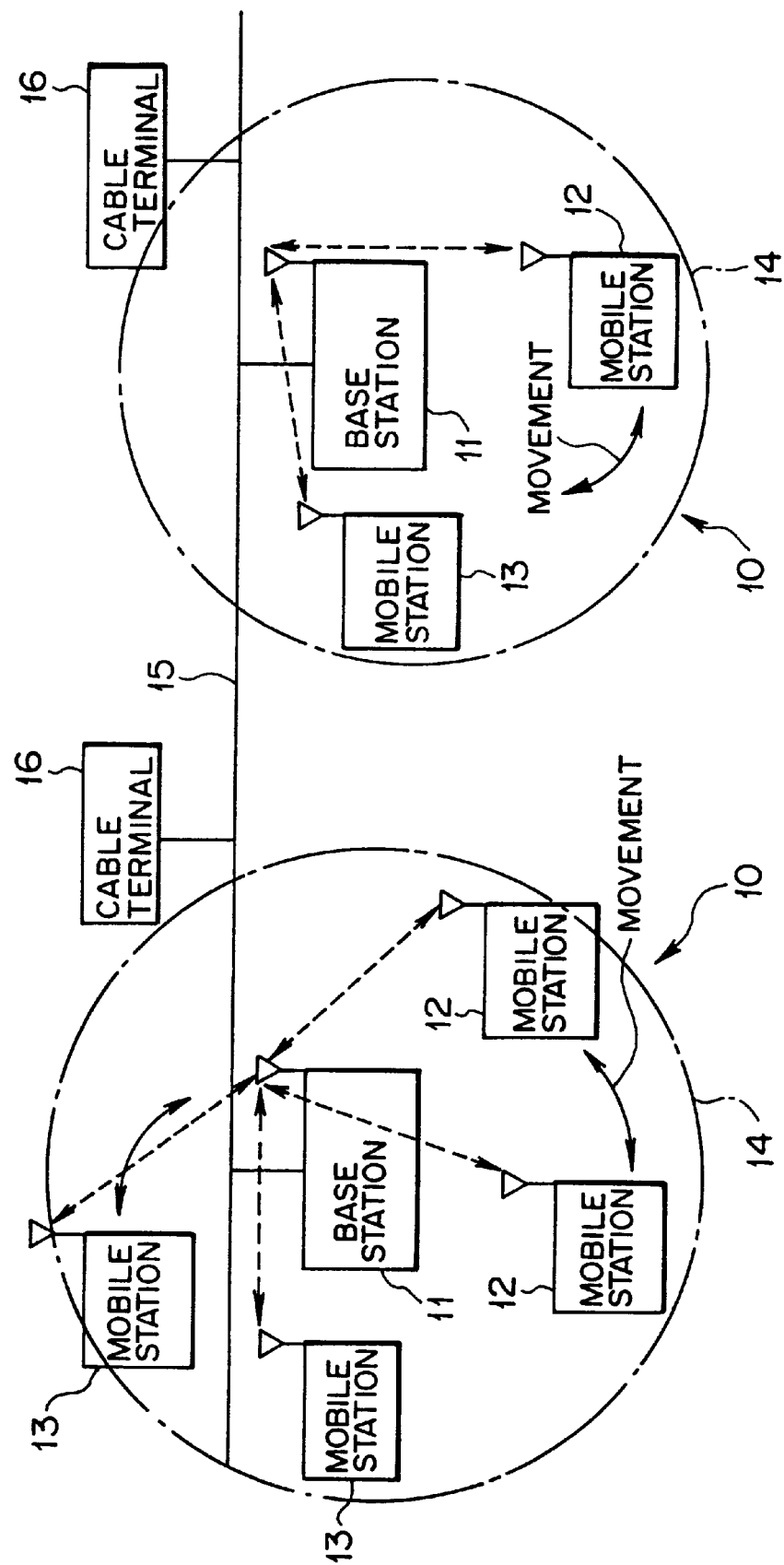
FIG. 5 is a block diagram showing a communication model suitably adapted for a radio communications system according to a first embodiment of the present invention.
Figure 21:
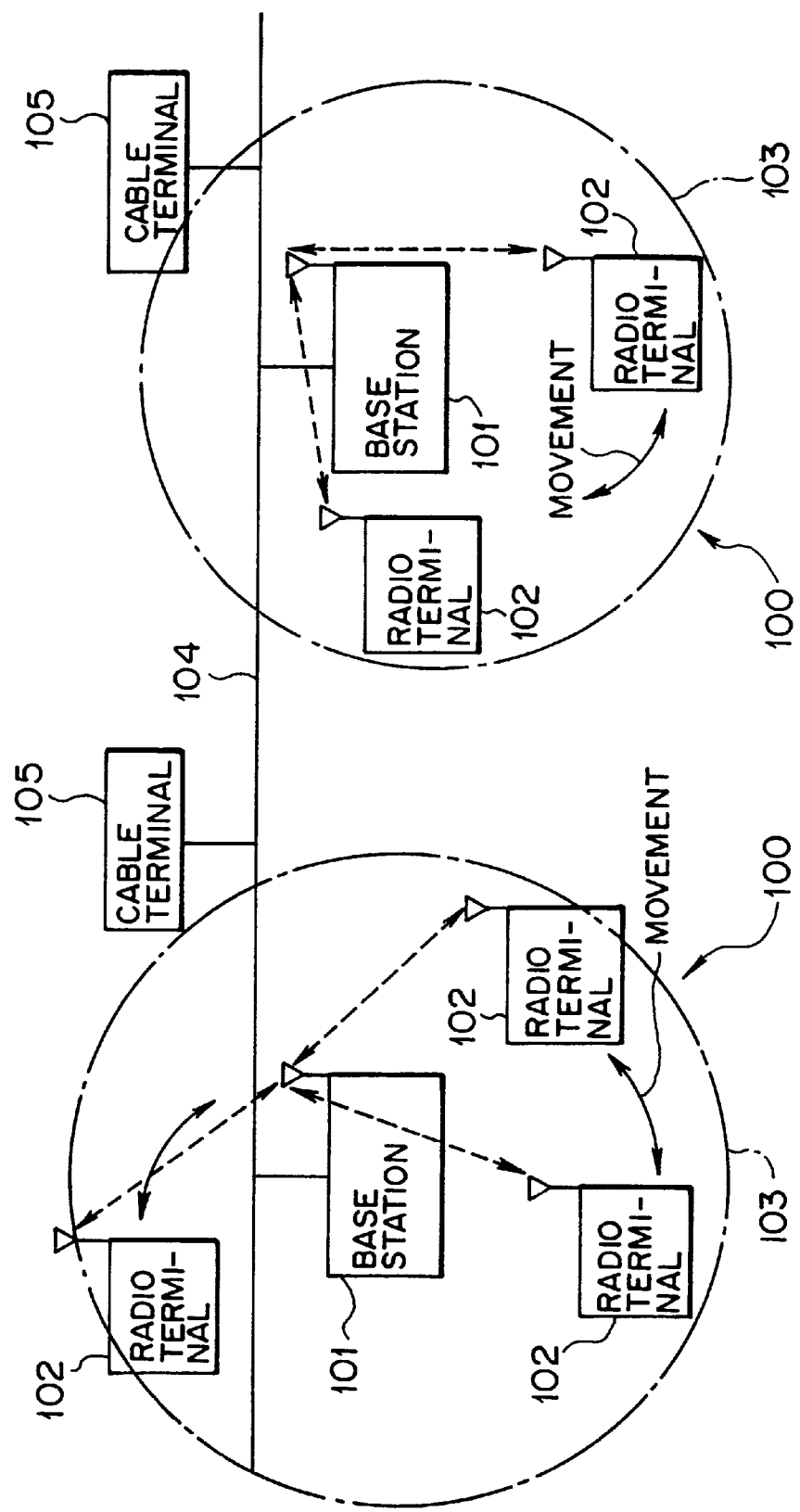
FIG. 21 is a block diagram illustrating a communication model suitably adopted for a radio LAN acting as a general radio communications system.
Figure 22:
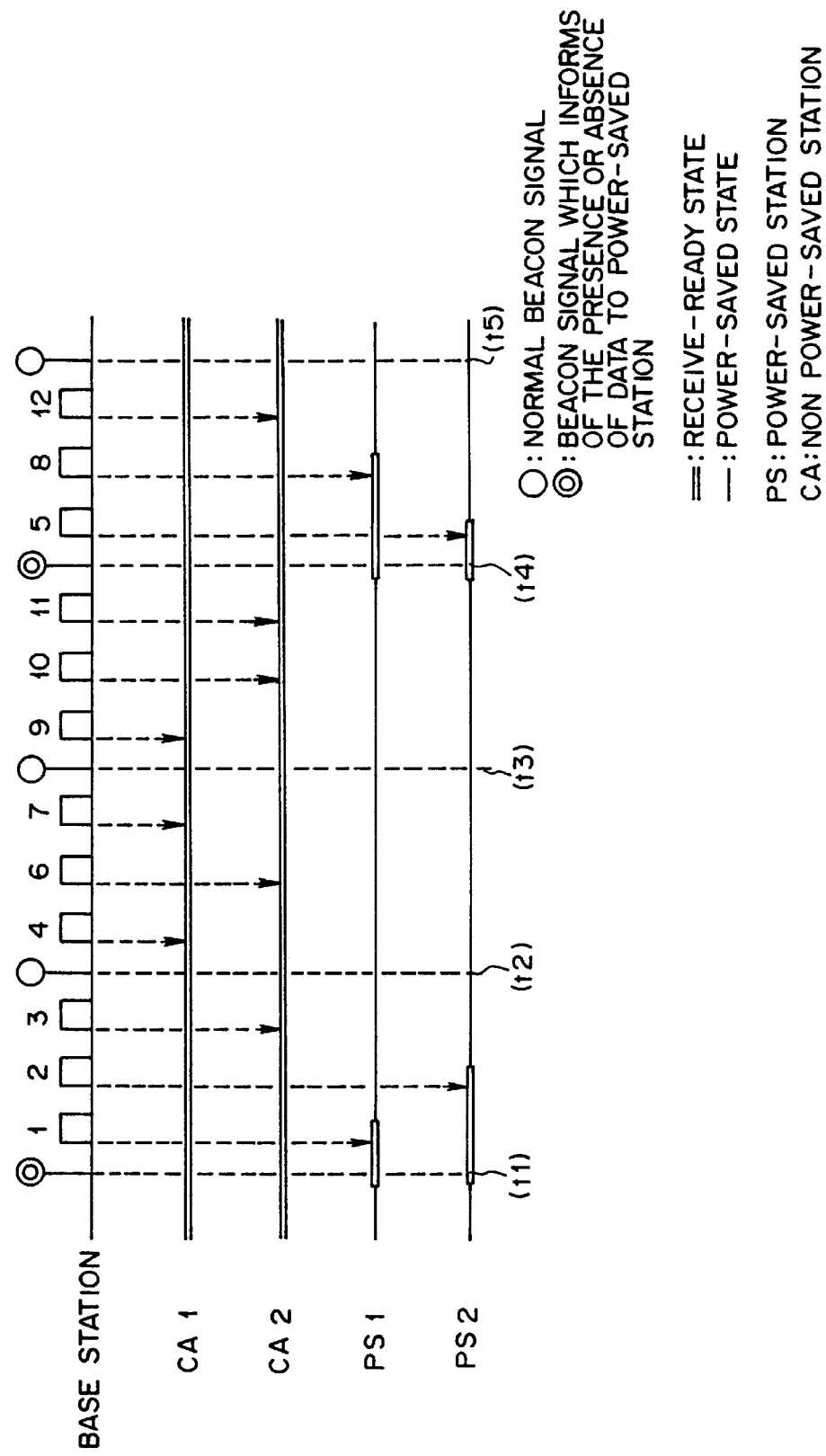
FIG. 22 is a timechart used for explaining the operation of a general radio communications system.
Figure 23:
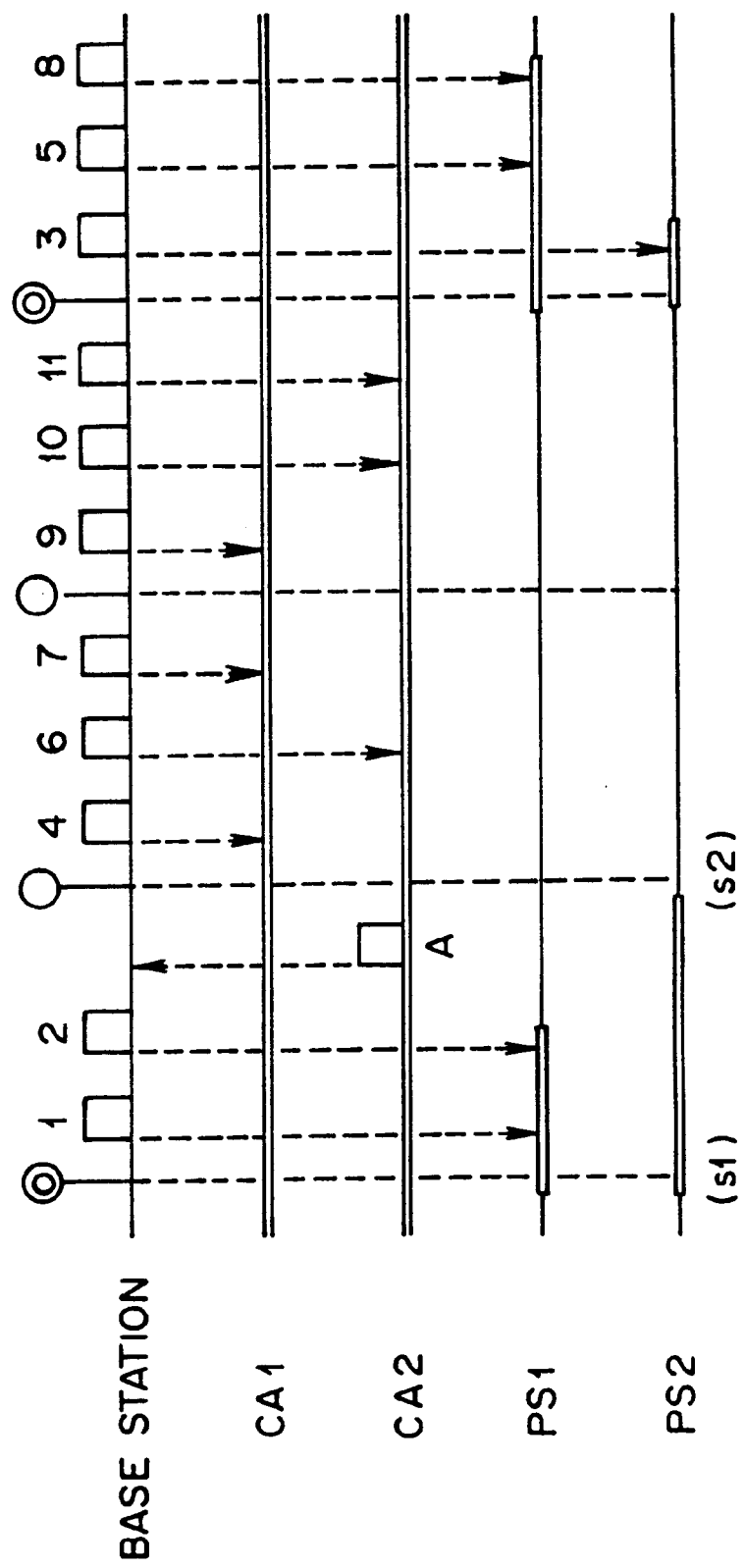
FIG. 23 is a timechart used for explaining the operation of a general radio communications system.

FIG. 5 is a block diagram illustrating a communications model adopted to the radio communications system according to a first embodiment of the present invention. Referring to FIG. 5, numeral 10 represents a radio LAN (Local Area Network) acting as a radio communications system. Like the configuration shown in FIG. 21, the radio LAN 10 includes a plurality of normal mobile stations 12 and a plurality of intermittent power-on type mobile stations 13 (hereinafter sometimes described merely as mobile stations 12 and 13). The radio LAN 10 consists of a base station 11 which accommodates mobile stations 12 and 13 covered in the self-radio area 14.

That is, in each radio LAN 10, communication can be established by wirelessly connecting the base station 11 to mobile station 12 and 13 via a radio network.

The mobile station 12 and 13 can be formed as data communications terminals, each of which performs data communications using, for example, personal computers. Moreover, since the normal mobile station 12 is in a normally-powered-on state, the intermittent power-on type mobile station 13 shifts to its powered-on state synchronously with the receiving timing of the beacon signal (to be described later) and sets as a data receive-ready period the constant period after receiving the beacon signal.

In other words, since the intermittent power-on type mobile station is constituted as a reduced power mobile station because electric power is intermittently supplied.

In the radio LAN 10, each of a plurality of base stations 11 regularly emanates a beacon signal to the normal mobile station 12 and the intermittent power-on mobile station 13 and communicates controllably with them by radio.

That is, a plurality of base stations 11 are connected via cable network 15 accommodating cable terminals 16. Thus, the mobile stations 12 and 13 accommodated in each base station 11 can communicate with terminals (e.g. mobile stations 12 or cable terminals 15) on the cable network 15 or radio network by way of the base station 11.

Figure 6:
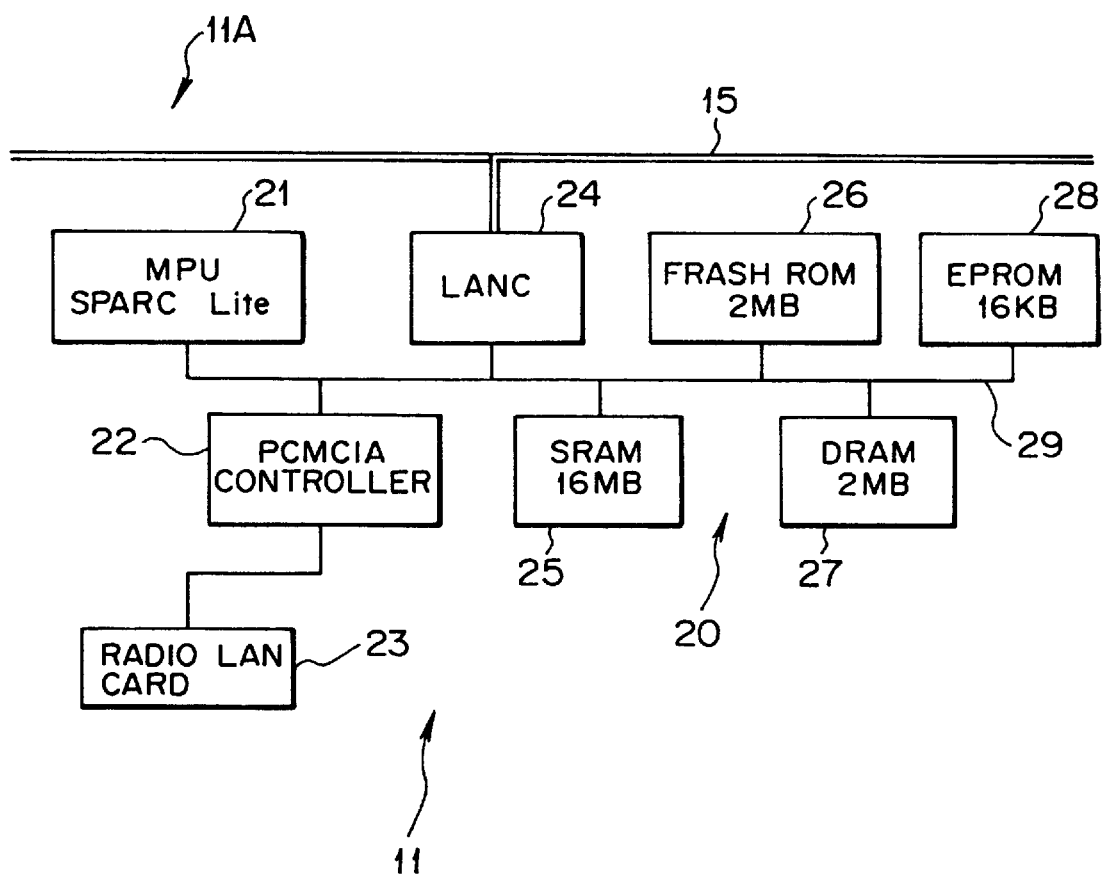
FIG. 6 is a diagram showing the hardware configuration of a mobile station according to the first embodiment of the present invention.

The base station 11 has the hardware configuration as shown in detail in FIG. 6. As shown in FIG. 6, the MPU (MicroProcessor Unit, MPU SPARK Lite) 21, PCMCIA (Personal Computer Memory Card International Association) controller 22, LANC (LAN Controller) 24, SRAM 25, FLASH ROM 26, DRAM 27, and EPROM 28 are mutually connected via the bus 29.

The MPU 21 Controls the whole function system connected via the bus 29 and manages connection information regarding the mobile stations 12 and 13 accommodated by the base station 11 itself.

The PCMCIA controller 22 is connected to the radio LAN card acting as a radio unit which transmits and receives a radio signal between the mobile stations 12 and 13 to control the radio LAN card 23.

In other words, the radio LAN card 23 is inserted into a card insertion slot (not shown) arranged in the main body of the base station 11 to connect to the PCMCIA controller 22. The radio LAN card 23 has the hardware configuration shown in FIG. 7.

Moreover, the LANC 24 is connected to the cable network 15 and interfaces the cable network 15 with the radio network which is used to establish communications between the mobile stations 12 and 13 accommodated in the base station 11 itself.

The SRAM 25, FLASH ROM 26, DRAM 27, and EPROM 28 provide the storage unit 20 that stores program and program operation data (e.g., connection information regarding to connection to the mobile stations 12 and 13 accommodated by the base station 11 itself or management information of the base stations 12 and 13.

Each of the mobile stations 12 and 13 performs data communications via the base station 11 and cable network 14. The radio unit which has the function of receiving a data signal in response to a radio signal has the hardware configuration shown in FIG. 7.

Figure 7:
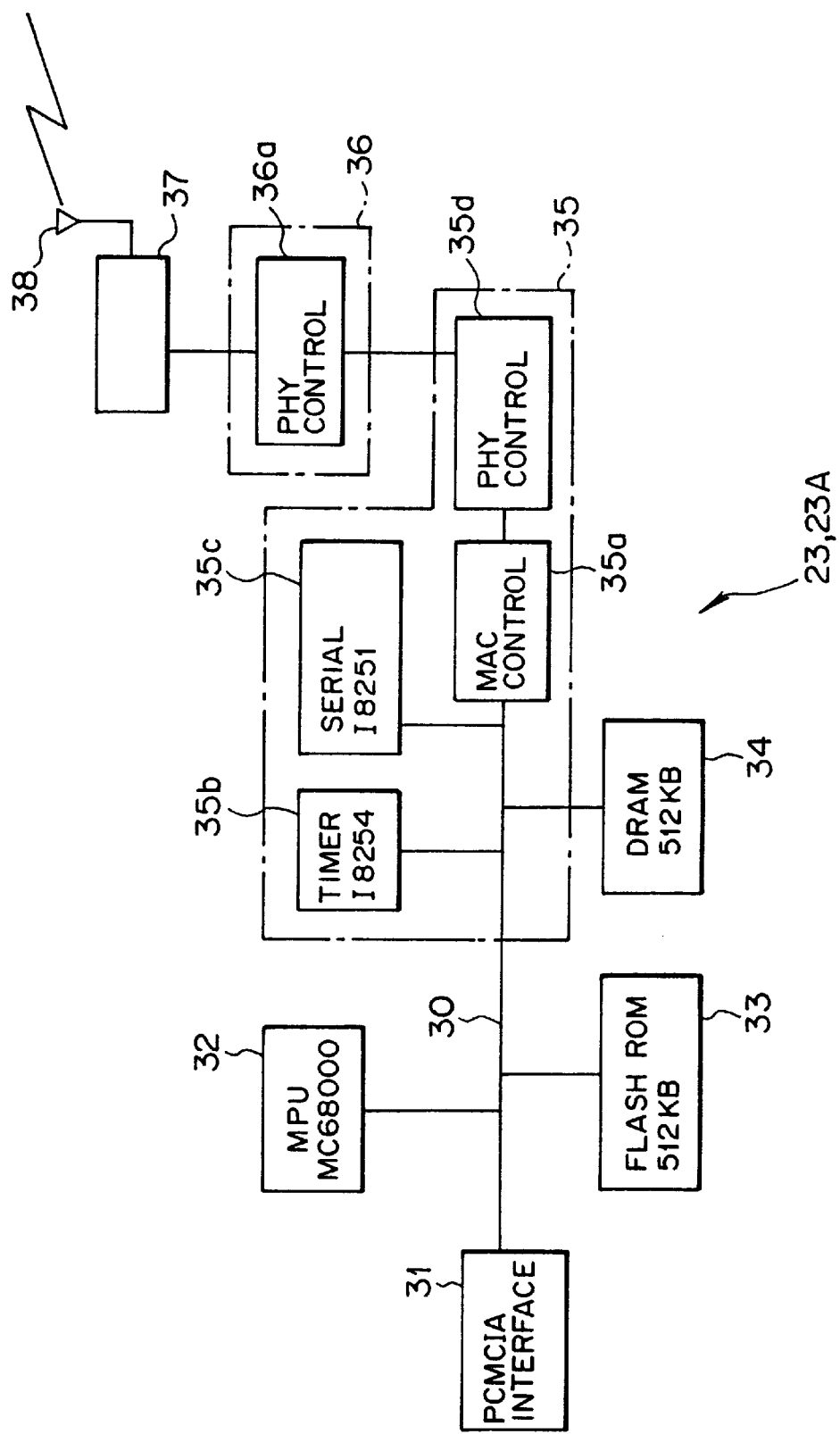
FIG. 7 is a diagram showing the hardware configuration of a mobile station according to the first embodiment of the present invention.

That is, like the radio LAN card connected to the PCMCIA controller 22 in the base station 11, the hardware used as a radio portion in each of the mobile stations 12 and 13 has the configuration shown in FIG. 7 (the numeral 23A representing the radio LAN card constituting the mobile stations 12 and 13).

In each of the radio LAN cards 23 and 23A shown in FIG. 7, numeral 31 represents a PCMCIA interface. The PCMCIA interface 31 functions as an interface of performing a data exchange between the radio LAN cards 23 and 23A and an external circuit (e.g., the PCMCIA controller 22 in the radio LAN card 23.)

Numeral 32 represents a MPU that executes a program to comprehensively control the radio LAN cards 23 and 23A. Numeral 33 represents a FLASH ROM that stores programs or like and has a memory capacity of, for example, 512 KB. Numeral 34 stores program operation data, communications data, or the like and has a memory capacity of 512 KB.

The PCMCIA interface 31, MPU 32, FLASH ROM 33, and DRAM 34 are mutually connected to the MAC control units 35a, timer 35b and serial interface 35c (to be described later) via the bus 30.

Numeral 35 represents a first integrated circuit. The first integrated circuit 35 consists of a MAC (Media Access Control) control unit 35a, a timer 35b, a serial interface 35c, and a first PHY (PHYsical) control unit 35d.

The MAC control unit 35a controls the data transmitting order when data is transmitted via the radio line. The first PHY control unit 35d functions as a physical interface of performing a serial/parallel conversion process of a transmission signal or receiving signal. The MAC control unit 35a, the timer 35b and the first integrated circuit 35 are formed.

Numeral 36 represents a second integrated circuit. The second integrated circuit 36 includes a PHY control unit 36a that functions as a physical interface which subjects a transmission signal and receiving signal to a frequency converting process.

Numeral 37 represents a transmit/receive unit. The transmit/receive unit 37 transmits and receives a radio signal via the antenna 38.

Figure 8:
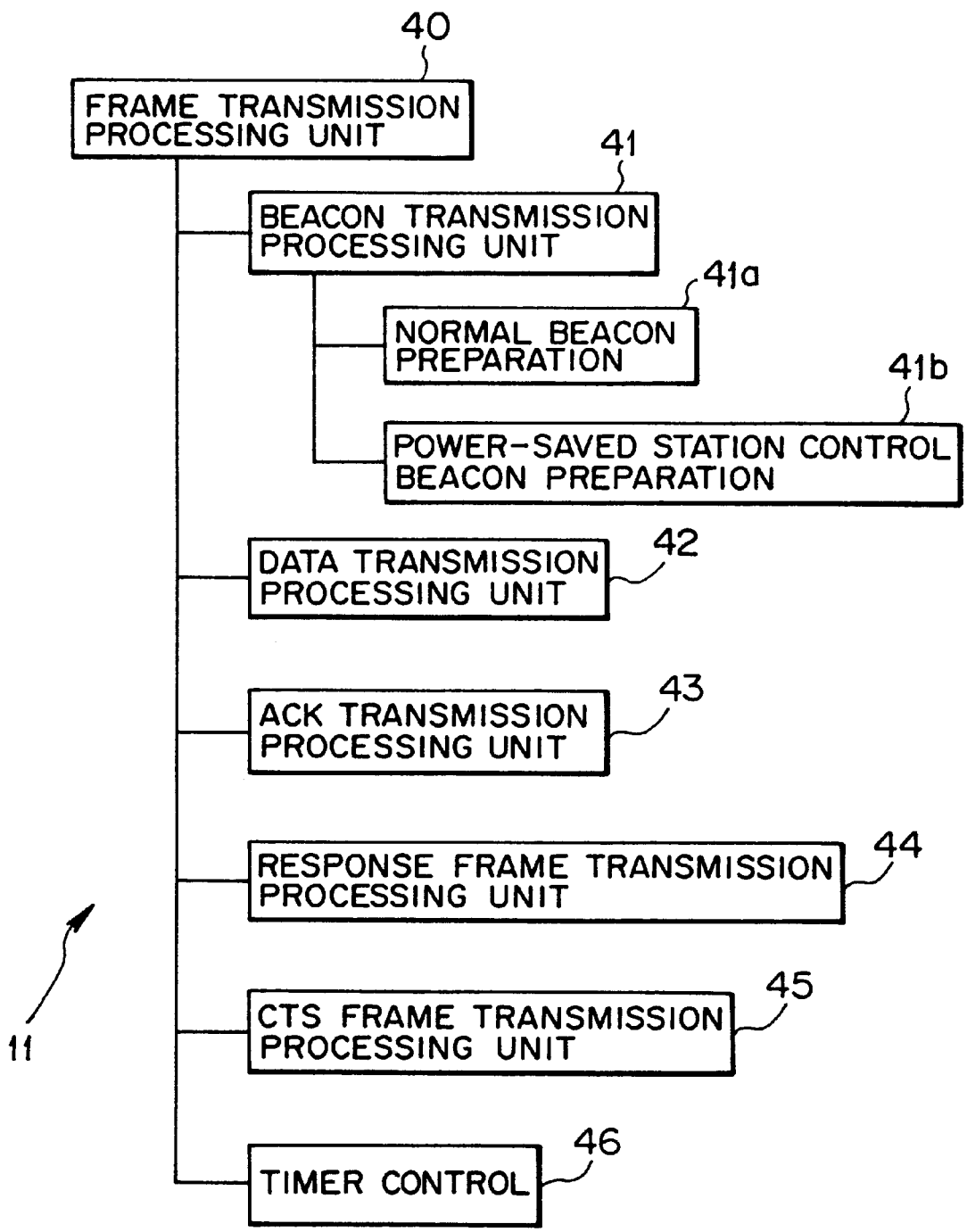
FIG. 8 is a functional block diagram illustrating the frame transmission processing unit of a base station according to an embodiment of the present invention.
Figure 9:
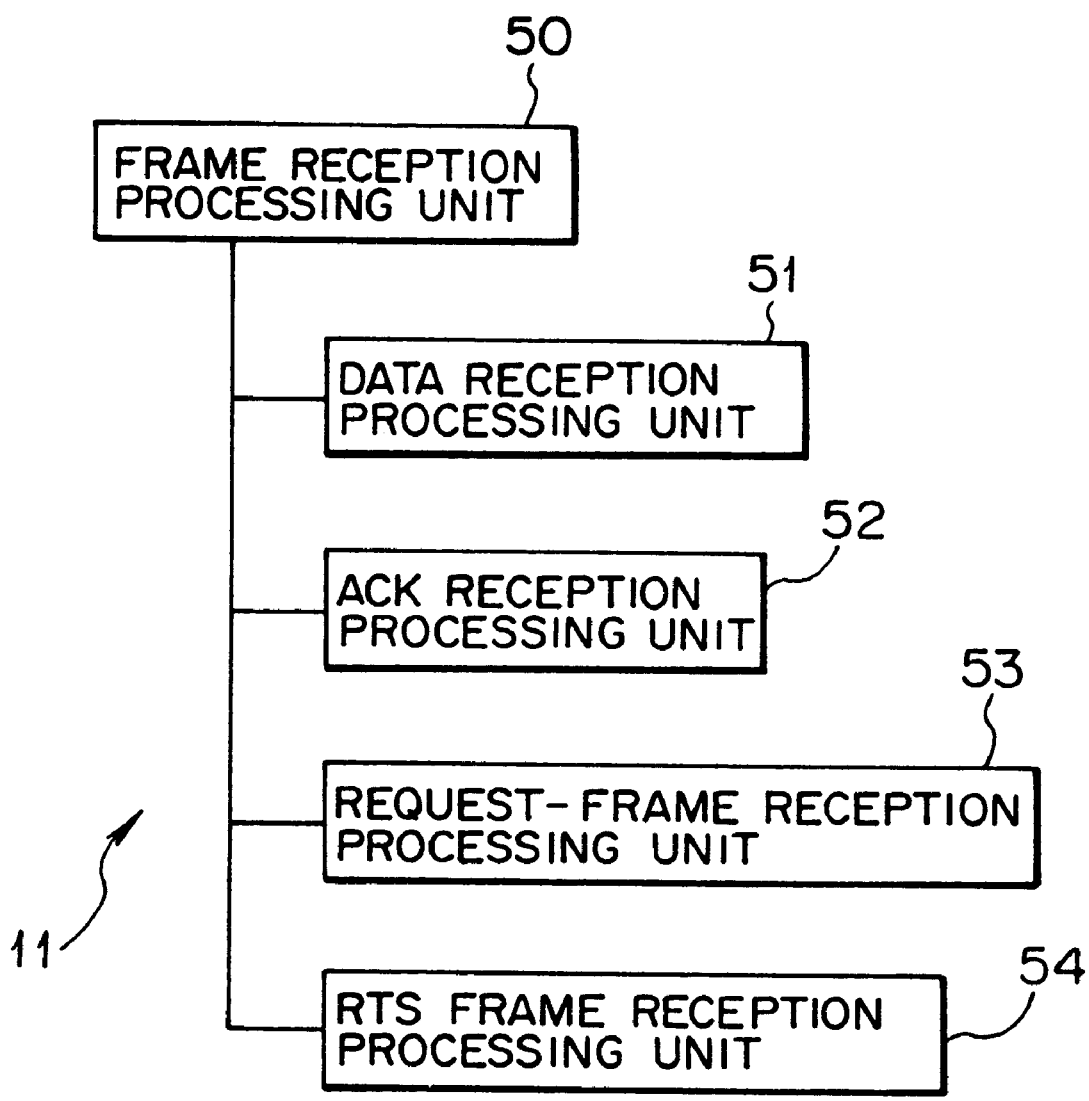
FIG. 9 is a functional block diagram illustrating the frame transmission processing unit of a base station according to an embodiment of the present invention.

The function of the frame reception processing unit 50 shown in FIG. 9 as well as the function of the frame transmission processing unit 40 shown in FIG. 8 can be realized under the software control which is realized with the MPU 32, FLASH ROM 33 and DRAM 34 which provide the radio LAN card 23 in the base station 11.

The frame transmission processing unit 40 functions as the beacon transmission processing unit 41, the data transmission processing unit 42, the ACK (ACKnowledge) transmission processing unit 43, the response frame transmission processing unit 44, the CTS Clear To Send) frame transmission processing unit 45, and the timer control unit 46.

The beacon transmission processing unit 41 creates a beacon signal to synchronize the base station 11 with the mobile stations 12 and 13 and transmits the beacon signal to the mobile stations 12 and 13. The beacon transmission processing unit 41 consists of a normal beacon producing unit 41a that produces and transmits a beacon signal to the normal mobile station 12 and a power-saved station control beacon producing unit 41b that produces and transmits a beacon signal to the intermittent power-on type mobile station 13 acting as a power saved station.

The data transmission processing unit 42 subjects transmission data transmitted to the mobile stations 12 and 13 to a transmission process. The ACK transmission processing unit 43 transmits a receive acknowledgement signal in response to a receive signal from the mobile stations 12 and 13. The response frame transmission processing unit 44 transmits a response frame as a response signal to the mobile stations 12 and 13, in response to a request frame from the mobile stations 12 and 13.

Moreover, the CTS frame transmission processing unit 45 transmits a CTS frame to report information regarding that the data can be transmitted to the base station 11, to the mobile stations 12 and 13. The timer control unit 46 produces the timing of a control signal such as a data signal or beacon signal transmitted from the frame transmission processing unit 40.

The frame reception processing unit 50 shown in FIG. 9 functions as a data reception processing unit 51, an ACK (ACKnowledge) reception processing unit 52, a request frame reception processing unit 53, and a RTS (Request To Send) frame reception processing unit 54.

That is, the data reception processing unit 51 subjects receive data from the mobile stations 12 and 13 to a receiving process. The ACK reception processing unit 52 receives a reception acknowledge signal regarding that data has been transmitted from the base station 11 to mobile stations 12 and 13, from the mobile stations 12 and 13.

The request frame reception processing unit 53 receives a request frame from each of the mobile stations 12 and 13.

The RTS frame reception processing unit 54 receives a RTS frame to report requesting a data signal to be transmitted from the mobile stations 12 and 13.

Figure 10:
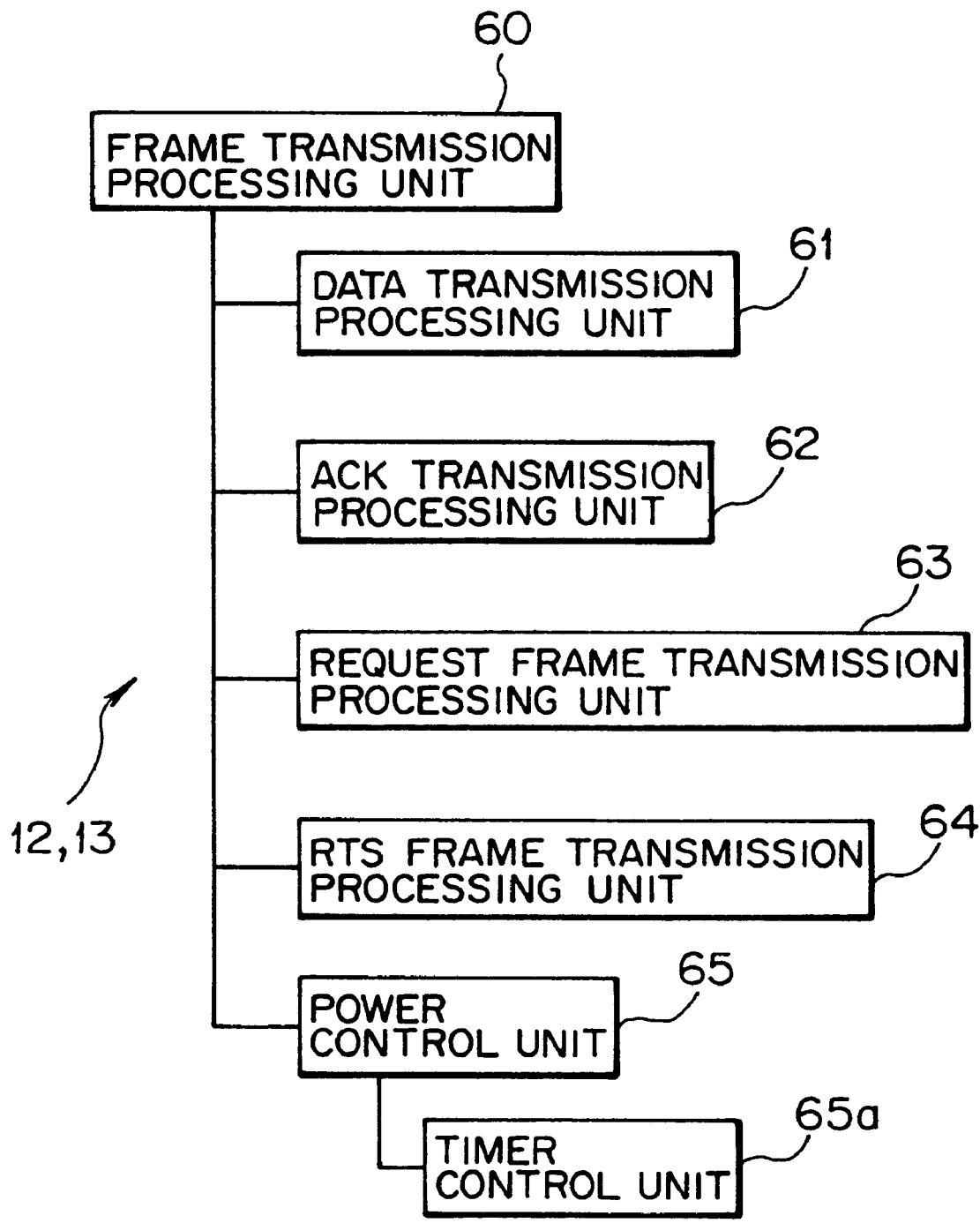
FIG. 10 is a functional block diagram illustrating the frame transmission processing unit of a base station according to an embodiment of the present invention.
Figure 11:
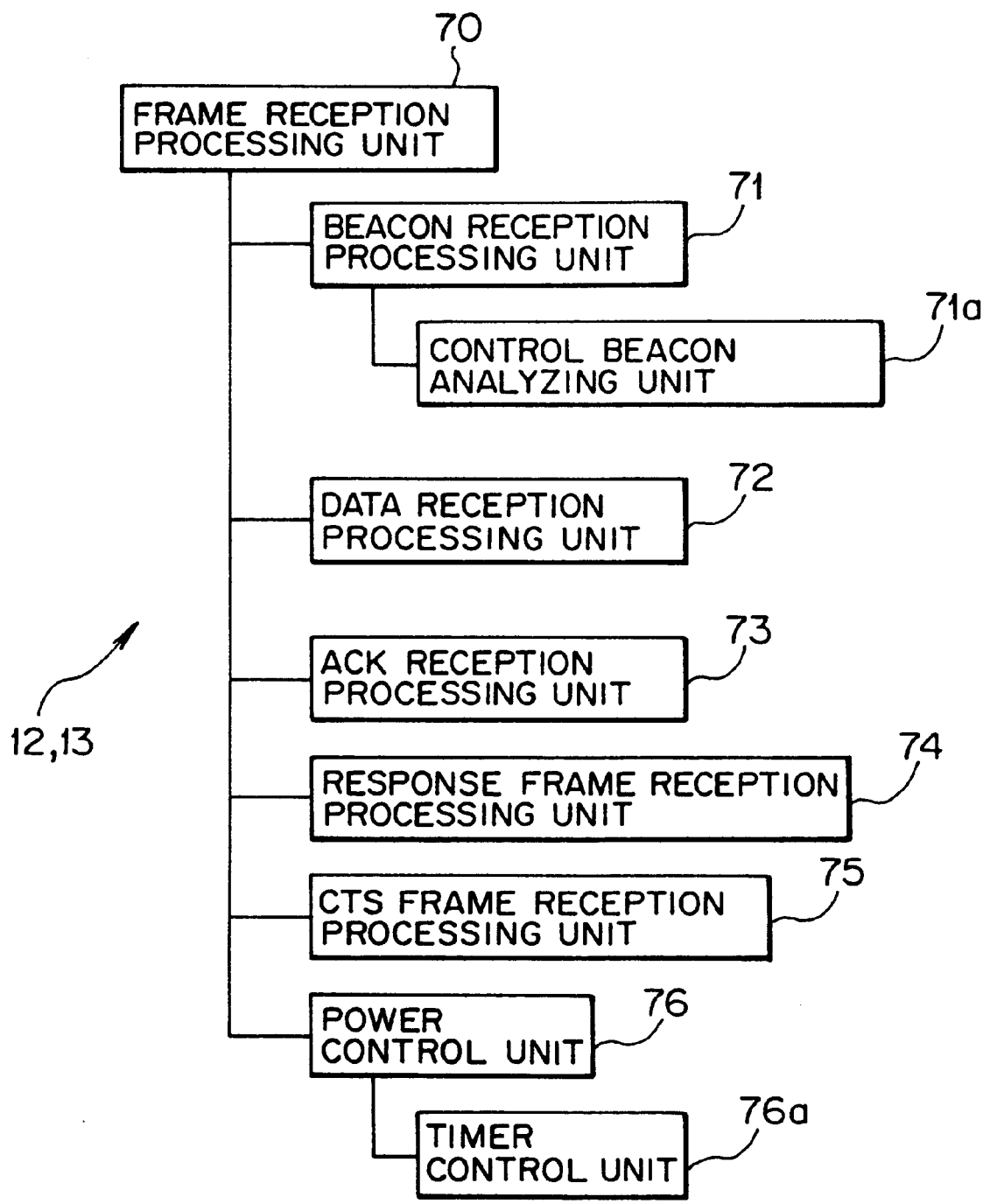
FIG. 11 is a functional block diagram illustrating the frame transmission processing unit of a base station according to an embodiment of the present invention.

Furthermore, each of the mobile stations 12 and 13 can function as the frame reception processing unit 70 shown in FIG. 11 as well as the frame transmission processing unit 60 shown in FIG. 10 under the control software for the MPU 32, FLASH ROM 33 and DRAM 34 which provides a radio LAN card 34A.

That is, the frame transmission processing unit 60, shown in FIG. 10, functions as the data transmission processing unit 61, the ACK (ACKnowledge) transmission processing unit 62, the request frame transmission processing unit 63, the RTS (Request To Send) frame transmission processing unit 64, and the power control unit 65.

The data transmission processing unit 61 transmits data from the mobile stations 12 and 13 to the base station 11. The ACK transmission processing unit 62 transmits a transmission acknowledgment signal to the base station 11, in response to a signal transmitted from the base station 11 to the mobile stations 12 and 13.

The request frame transmission processing unit 63 transmits a request frame to the base station 11. The RTS frame transmission processing unit 64 transmits a RTS frame to the base station 11 to report a signal transmission request.

The power control unit 65 controls the transmission power when the mobile stations 12 and 13 transmit a data signal or control frame. The power control unit 65 includes a timer control unit 65a. The transmission power of the data signal or control frame is controlled according to the timer count information of the timer 65a.

The frame reception processing unit 70, shown in FIG. 11, functions as the beacon reception processing unit 71, the data reception processing unit 72, the ACK reception processing unit 73, the response frame reception processing unit 74, the CTS frame reception processing unit 75 and the timer control unit 76.

That is, the beacon reception processing unit 71 subjects a beacon signal from the base station 11 to a receiving process. The beacon reception processing unit 71 includes a control beacon analyzing unit 71a which analyzes a received beacon signal.

The data reception processing unit 72 subjects data from the base station 11 to a receiving process. The ACK reception processing unit 73 receives a receive acknowledgment signal from the base station 11. The response frame reception processing unit 74 receives a response frame from the base station 11.

Moreover, the CTS frame reception processing unit 75 receives a CTS frame from the base station 11. The power control unit 76 controls the on/off state of the power supply. The power control unit 76 controls the on/off state of the power supply according to the timer count value of the timer control unit 76a.

A connection operation between a base station and a mobile station in a radio communications system according to the first embodiment is described below:

In the radio communications system with the above-mentioned configuration according to an embodiment of the present invention, when communication between the base station 11 and the mobile stations 12 and 13 is established, the base station 11 accommodating the self mobile stations 12 and 13 is set (connection between the mobile stations 12 and 13 and the base station 11) by exchanging, if necessary, the request frame and the response frame with a desired base station 11.

Figure 12:
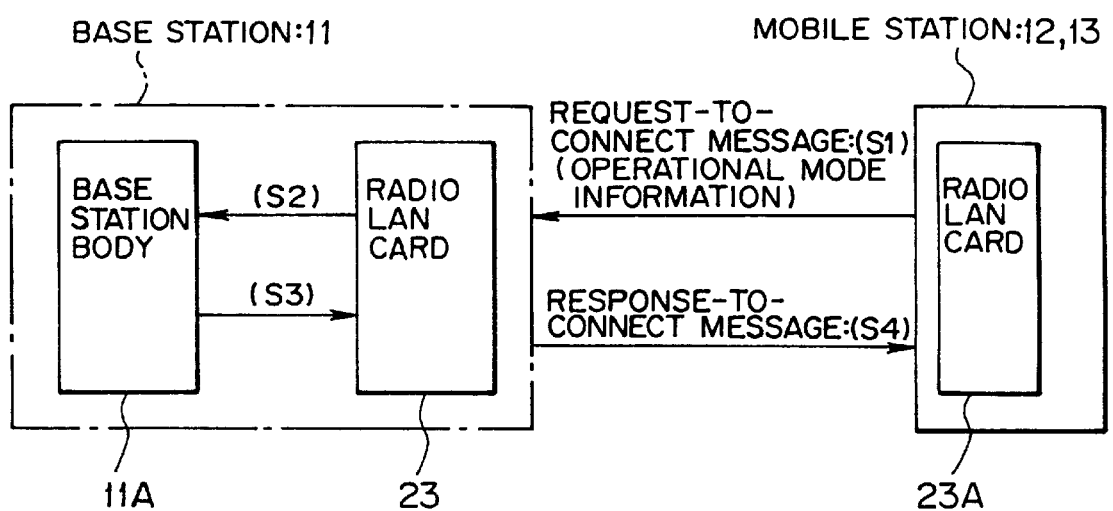
FIG. 12 is a block diagram illustrating used for explaining an operation in which a base station and a mobile station according to an embodiment of the present invention are connected.

When the mobile station 12 or 13 which is in motion changes the base station 11 accommodating it, a connection request, as shown in FIG. 12, is issued to the changed base station 11 by transmitting a request frame from the request frame transmission processing unit 63 to the base station 11 in the mobile station 12 or 13, together with operation mode information (identification information for identifying the intermittent power-on type mobile station or normal mobile station) (refer to the signal S1).

A registration request is made to the base station 11A using the radio LAN card 23A in the base station 11 when the request frame reception processing unit 53 receives a request frame from the mobile station 12 or 13 (refer to the signal S2).

Thereafter, since the registration process (storage of the operation mode of the mobile stations 12 and 13) regarding the connection operation to the mobile stations 12 and 13 is performed in the base station 11A, a response is issued to the radio LAN card 23 (refer to the signal S3).

In the radio LAN card 23 which receives the response to the base station 11A, the response frame transmission processing unit 44 transmits a response frame as a response to the request frame and then transmits a connection acknowledgment message from the base station 11 to the mobile stations 12 and 13 (refer to the signal S4).

Each of the mobile stations 12 and 13 can recognizes that a desired base station 11 is connected by receiving the above-mentioned response frame in the response frame reception processing unit 74.

Figure 13:
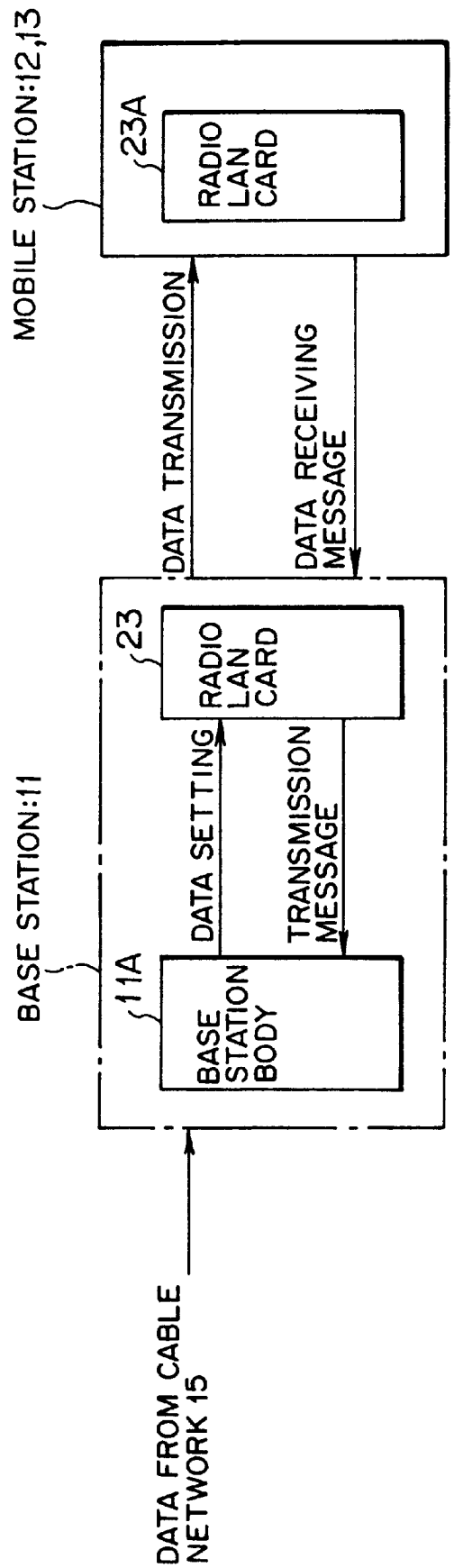
FIG. 13 is a block diagram illustrating used for explaining an operation in which a base station and a mobile station according to an embodiment of the present invention are connected.

A first signal transmit/receive mode in a radio communications system according to this embodiment is described below:

In the first signal transmit/receive mode of the radio LAN 10 in the radio communications system according to the embodiment, when the base station 11 is connected to the mobile stations 12 and 13, signals are exchanged between the base station 11 and the mobile stations 12 and 13, as follows:

For example, as shown in FIG. 13, when the base station 11A receives data from the cable network 15, the MPU 21 checks whether the received data corresponds to data to the mobile stations 12 and 13 by referring to the storage unit 20 in the base station 11A, based on the address information of the received data.

When data transmitted from the cable network 15 is data for the mobile stations 12 and 13, the MPU 21 sets data for the mobile stations 12 and 13 to the radio LAN card 23 via the PCMCIA controller 22, together with the operation mode information of each of the mobile stations 12 and 13.

Thus, the radio LAN card 23 can transmit data to the destination mobile stations 12 and 13 in accordance with the operation mode.

Figure 14:
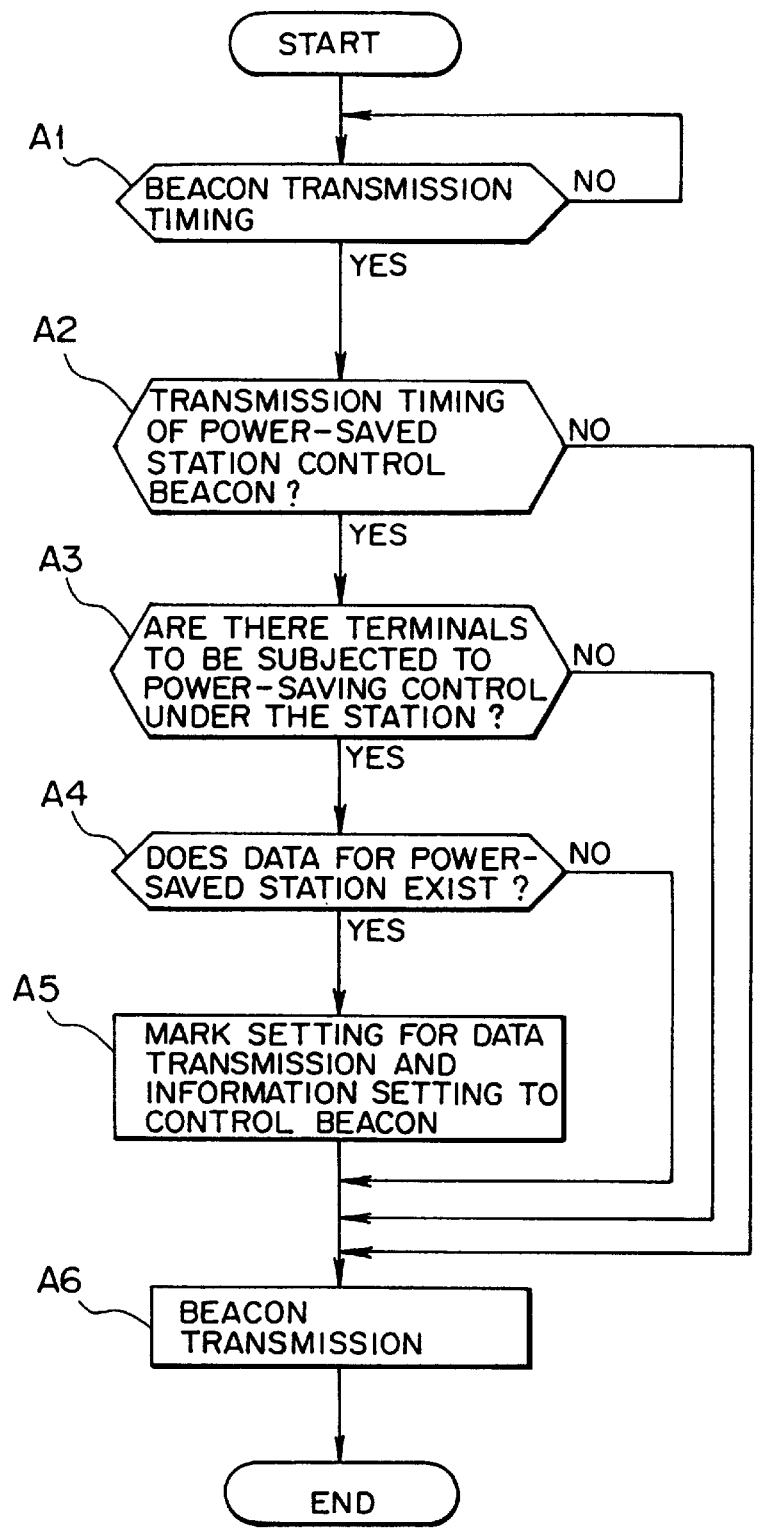
FIG. 14 is a flowchart used for explaining the first signal transmit/receive mode of a radio communications system according to an embodiment of the present invention.

For example, as shown with the flowchart in FIG. 14, when the transmission timing of a beacon signal has come from the beacon transmission processing unit 41 under the control of the timer control unit 46 in the base station 11 (YES route in step A1), the beacon signal can be transmitted by, if necessary, setting information representing a power-saving control beacon.

In operation, with the transmission timing of the beacon signal being a power-saving control transmission timing (YES route in step A2), the intermittent powered-on mobile station 13 acting as a power-saving control terminal under the base station 11 (YES route in step A3), and data transmission request produced to any one of intermittent power-on mobile stations 13 in the base station 11 (YES route in step A4), the power-saving control beacon producing unit 41b transmits a beacon signal by setting information representing a power-saving control beacon (step A5 and step A6).

The information included in the beacon signal includes information which recognizes the intermittent power-on mobile station 13 as a transmission destination. Thus, in each intermittent power-on mobile station 13 which has been received, the powered-on state is maintained when there are data for the self station and the power supply can be turned off when there are no data for the self station.

In other words, in the intermittent power-on type mobile station 13, the control beacon analysis processing unit 71a analyzes a beacon signal received in the beacon reception processing unit 71. Then, the power control unit 76 is controlled based on the analysis result.

The intermittent power-on type mobile station 13 shifts its powered-on state under the power control unit 76 synchronously with the receiving timing of a power-saving control beacon signal. As a result, a constant period of time after receiving a beacon signal is set as a data receive-ready period.

The control beacon analyzing unit 71a analyzes transmission data information (destination station information where data is transmitted after completion of a beacon transmission) included in a received beacon signal. The power supply is maintained in an on-state when there are data for a self station, and the power supply is turned off when there are no data for self station.

Where the transmission timing of a beacon signal is not a transmission timing of a power-saving control beacon (NO route in step A2), there are no intermittent power-on type mobile stations 13 under the base station 11 (NO route in step A3), or a data transmission request is not issued to any one of intermittent power-on mobile stations 13 in the base station 11 (NO route in step A4), the normal beacon producing unit 41a produces and transmits a beacon signal to the normal mobile station 12.

Figure 15:
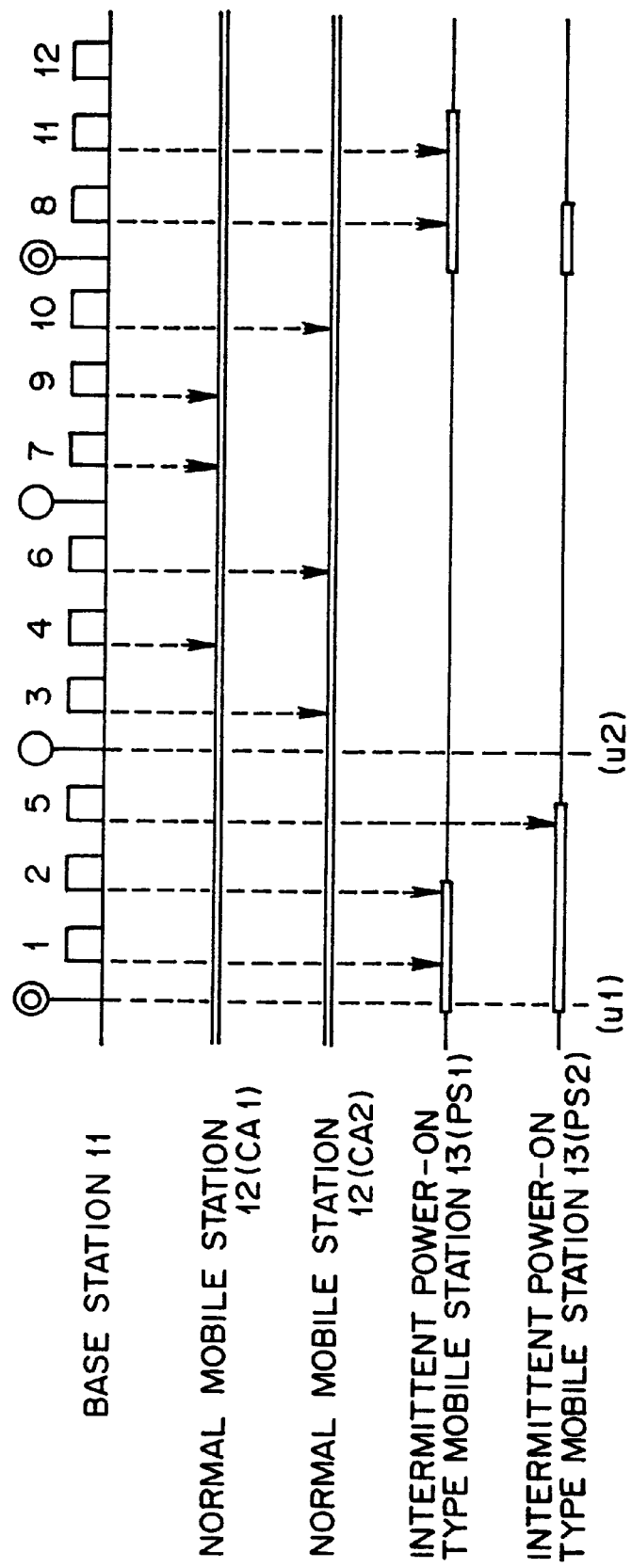
FIG. 15 is a flowchart used for explaining the first signal transmit/receive mode of a radio communications system according to an embodiment of the present invention.

In operation, as shown in the timechart in FIG. 15, the beacon transmission processing unit 41 in the base station 11 transmits a power-saving station control beacon (refer to the symbol "⊙") every two beacon signals among beacon signals transmitted to two normal mobile stations (CA1, CA2) 12 and two intermittent power-on type mobile stations (PS1, PS2) 13, and transmits a beacon (refer to symbol "○") for normal mobile stations prepared by the remaining two normal beacon producing units 41a.

Moreover, when there are data to be transmitted to the intermittent power-on mobile station 13 during the data receive-ready period of the intermittent power-on type mobile station 13, the data transmission processing unit 42 in the base station 11 preferentially transmits the data over the transmission data to the normal mobile station 12 in a normally-powered-on state.

In operation, the data transmission processing unit 42 in the base station 11 basically transmits data in the order that data transmission requests occur after transmission of the beacon signal. Particularly, until the next beacon signal is transmitted after a power-saving control beacon signal (refer to time (u1) to time (u2) in FIG. 15, data to be transmitted to the intermittent power-on type mobile station 13 is preferentially transmitted over data to be transmitted to the normal mobile station 12.

For example, in the data transmission processing unit 42 in the base station 11, the fifth transmission request data (data "5" to be transmitted to the intermittent power-on mobile station 13 (PS2) is transmitted preferentially over the third transmission data "3" and fourth transmission data "4" to be transmitted to the normal mobile stations (CA2, CA1) 12. Thus, the delay in data transmission to the normal mobile station 12 is suppressed while delay in data transmission to the intermittent power-on type mobile station 13 prevented from becoming large.

In other words, the MPU 32, FLASH ROM 33, and DRAM 34 which provides the data transmission processing unit 42 in the base station 11 functions as priority transmitting means. When there are data to be transmitted to the intermittent power-on type mobile station 13 during a data receive-ready period, the priority transmitting means transmits the data preferentially, in comparison with transmission data to be transmitted to the normal mobile station 12 in a normal, powered-on state.

In each of the mobile stations 12 and 13, the ACK transmission processing unit 62 transmits an ACK signal as a receiving acknowledgment signal to the base station 11 every time when the data reception processing unit 72 receives data for the base station 11.

As a result, the delay in data transmission to the intermittent power-on type mobile station 13 can be prevented, without greatly delaying the data transmission to the normal mobile station 12, by transmitting data to the intermittent power-on type mobile station 13 for power-saving operation more preferentially than data to the normal mobile station 12.

As described above, according to the radio communications system according to the present invention, when there is data to be transmitted to the intermittent power-on type mobile station 13 during the data receive-ready period of the intermittent power-on type mobile station 13, the base station 11 can transmit the data preferentially over transmission data to be transmitted to the normal mobile station 12 in a normally-powered-on state. Hence, the power consumption of the intermittent power-on type mobile station 13 in a power-saving mode is reduced while the transmission throughput transmitted from the base station 11 to the intermittent power-on type mobile station 13 can be improved. Moreover, there is the advantage in that the load on which the base station 11 buffers data to be transmitted to the intermittent power-on type station 13 can be reduced.

A second signal transmit/receive mode in a radio communications system according to the embodiment is described below:

In the radio LAN 10 acting as a radio communications system according to the present embodiment, signals between the base station 11 and the mobile stations 12 and 13 can be exchanged in the second signal transmit/receive mode, as follow:

That is, when data are continuously transmitted from the base station 11 to the intermittent power-on type mobile station 13, this situation is reported. Then in response to the report, the intermittent power-on type mobile station 13 can receive continuously by delaying the shift to the power-saving state (in an off-state of the power supply) after the data reception.

In other words, when data are transmitted continuously beyond the data receive-ready period of the intermittent power-on type mobile station 13, the base station 11 reports as time extension information that data must be received beyond the data receive-ready period, to the intermittent power-on type mobile station 13. At the same time, when the intermittent power-on type mobile station 13 receives time extension information from the base station 11, it can extend the data receive-ready period by maintaining the powered-on state until all pieces of data to be continuously transmitted from the base station 11 are received.

When the time extension information is received by the beacon signal reception processing unit 71 and the data reception processing unit 72 in the intermittent power-on type mobile station 13, the power control unit 76 maintains the powered-on state until all pieces of data transmitted continuously are received.

Figure 16:
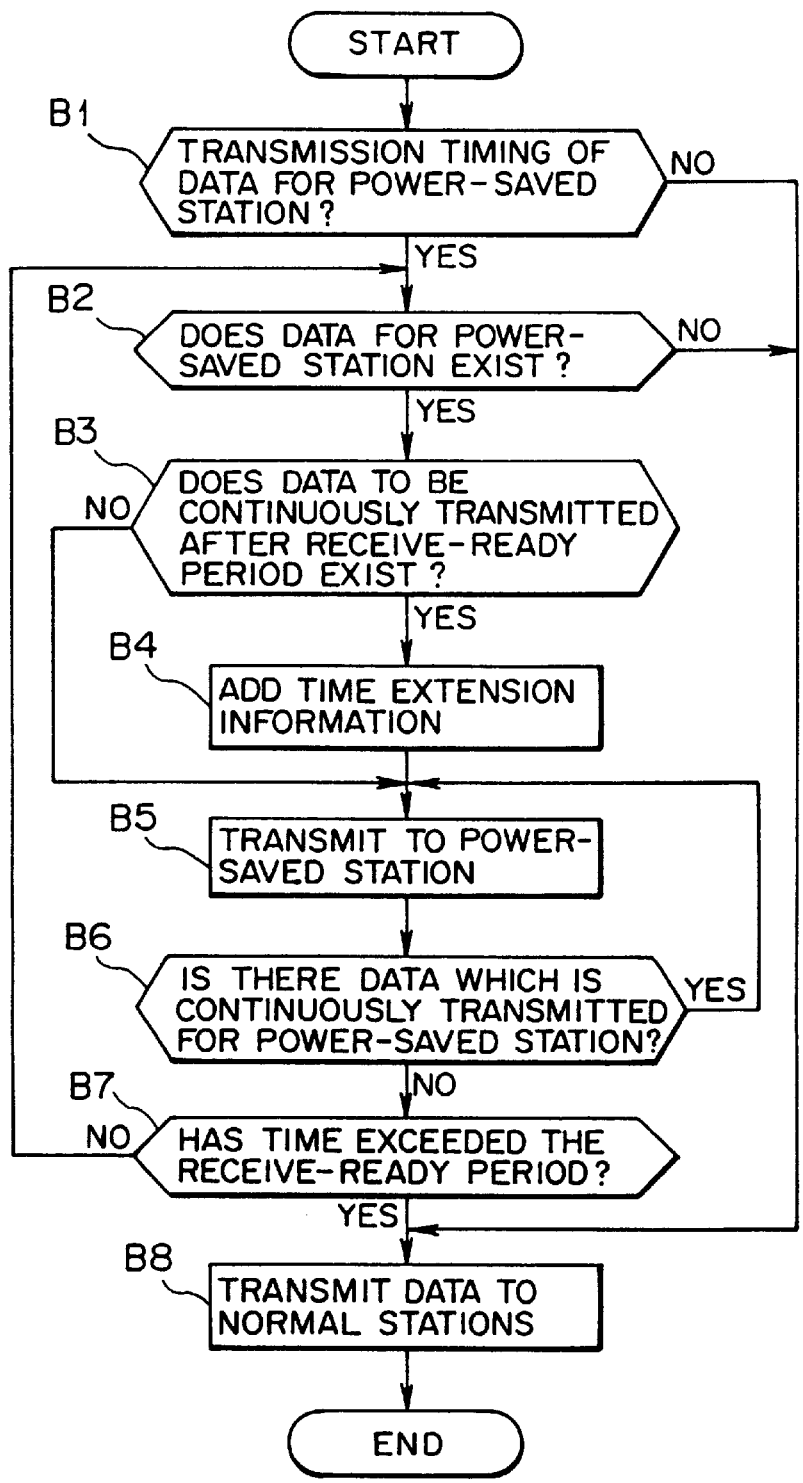
FIG. 16 is a flowchart used for explaining the first signal transmit/receive mode of a radio communications system according to an embodiment of the present invention.

In operation, as shown with the flowchart in FIG. 16, when there are data to the intermittent power-on type mobile station 13 at the transmission timing (YES route in step B1) of data transmitted to the intermittent powered-on type mobile station acting as a power-saving station (YES route in step B2), data is transmitted to the intermittent power-on type mobile station 13, as follows:

That is, when there is data to be transmitted to the intermittent power-on type mobile station 13 beyond the data receive-ready period, or the intermittent power-on type mobile station 13 must receive data beyond the data receive-ready period, data to which time extension information showing the above-mentioned situation is added is transmitted (from step B3 to step B4 via YES route).

When there are no data which must be received beyond data receive-ready period, transmission data for the intermittent powered-on type mobile station 13 is transmitted to the intermittent power-on type mobile station 13 without any change (from step B3 to step B5 via NO route).

Hence, a combination of the MPU 32, FLASH ROM 33 and DRAM 34 which provide the beacon transmission processing unit 41 and the data transmission processing unit 42 has the function of time extension reporting means. The time extension reporting means reports as time extension information the information that data must be received beyond the data receive-ready period, to the intermittent powered-on type mobile station 13 when data are continuously transmitted beyond the data receive-ready period of the intermittent power-on type mobile station 13.

The time extension information can be reported by including the same into transmission data to be transmitted from the data transmission processing unit 42 in the base station 11 to the intermittent power-on mobile station 13 or including the same into a beacon signal transmitted from the beacon transmission processing unit 41.

Furthermore, the base station 11 transmits data to be transmitted continuously to the intermittent power-on type mobile station 13 (from step B5 to step B6 via YES route). The intermittent power-on type mobile station 13 which has received time extension information can extend the data receive-ready period while maintaining the power-on state until data to be continuously received is completely received.

In other words, when the time extension information is received according to a beacon signal or data signal received by the beacon signal reception processing unit 71 and the data reception processing unit 72 in the intermittent power-on type mobile station 13, the power control unit 76 maintains the powered-on state until all pieces of data transmitted continuously from the base station 11 are received.

Therefore, a combination of the beacon signal reception processing unit 71, the data reception processing unit 72 and the power control unit 76 has the function of power control means. The power control means receives the time extension information representing that data must be received beyond data receive-ready period and maintains the powered-on state until all pieces of data transmitted continuously from the base station 11 have been received, thus extending a data receive-ready period.

Thereafter, when the data reception does not exceed the data receive-ready period after completion of a data transmission to the intermittent power-on type mobile station 13, a data transmission process is again performed to another intermittent power-on mobile station 13 (from step B7 to step B2 via NO route).

When the data reception exceeds the data receive-ready period after completion of a data transmission to the intermittent power-on type mobile station 13, a data transmission process is performed to a normal mobile station 12 acting as a normal station (step B8).

According to the radio communications system according to the present embodiment, when data are continuously transmitted beyond the data receive-ready period of the intermittent power-on mobile station 13, the base station 11 reports that data must be received beyond a data receive-ready period, as time extension information, to the intermittent power-on type mobile station 13. When receiving time extension information from the base station 11, the intermittent power-on mobile station 13 maintains the powered-on state until all pieces of data have been transmitted continuously from the base station 11, thus extending the data receive-ready period. As a result, the power consumption of the intermittent power-on type mobile station 13 in a power-saving state is reduced while the transmission throughput transmitted from the base station to the intermittent power-on type mobile station can be improved. Hence, there is the advantage in that the load on which the base station 11 buffers data to the intermittent power-on type mobile station 13 can be reduced.

Particularly, the throughput of the intermittent power-on type mobile station 13 can be improved significantly by continuously transmitting data to a single intermittent power-on type mobile station 13.

A third signal transmit/receive mode in a radio communications system according to this embodiment is described below:

In the radio LAN 10 acting as a radio communications system according to the present embodiment, signals between the base station 11 and the mobile stations 12 and 13 can be exchanged in the second signal transmit/receive mode, as follows:

That is, the base station 11 previously reports transmission information regarding data transmitted to the intermittent power-on type mobile station 13 during a data receive-ready period, to the intermittent power-on type mobile station 13, and transmits data within a predetermined period after completion of the data receive-ready period when it cannot transmit data included in the transmission information during the data receive-ready period. When not receiving data included in the transmission information reported previously from the base station 11 during the data receive-ready period, the intermittent power-on type mobile station 13 can maintain its powered-on state, thus extending the data receive-ready period by a predetermined time.

For example, the beacon transmission processing unit 41 in the base station 11 transmits transmission information included in a beacon signal transmitted at the beacon transmission timing. The data transmission information relates to data transmission to the intermittent power-on mobile station 13 during the data receive-ready period of the intermittent power-on type mobile station 13.

The beacon transmission processing unit 41 functions as transmission information reporting means that reports previously transmission information regarding data transmitted to the intermittent power-on type mobile station 13 during the data receive-ready period of the intermittent power-on type mobile station 13, to the intermittent power-on type mobile station 13.

Figure 17:
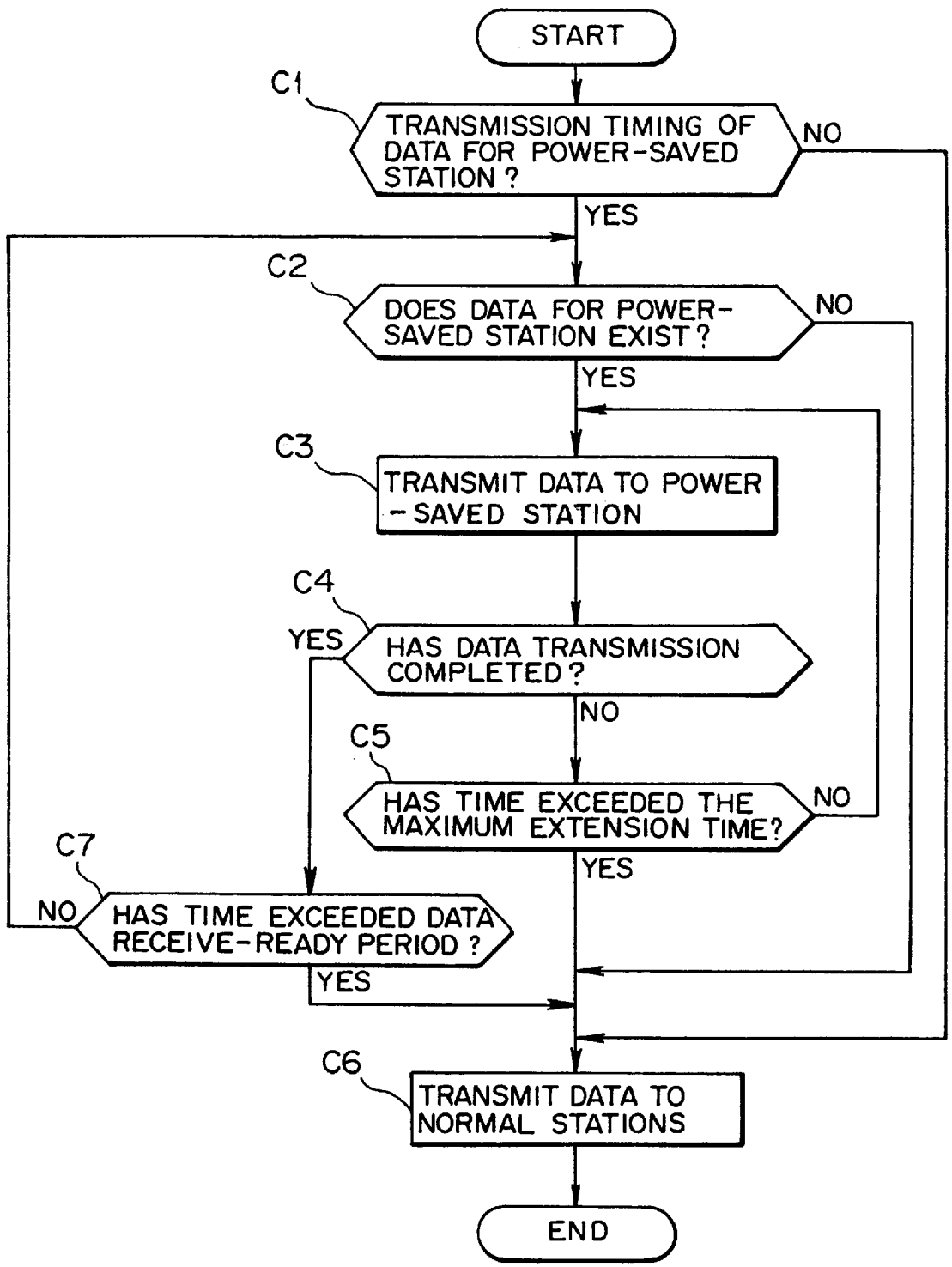
FIG. 17 is a flowchart used for explaining the first signal transmit/receive mode of a radio communications system according to an embodiment of the present invention.

Thereafter, as shown with the flowchart in FIG. 17, the base station 11 transmits data to an intermittent power-on type mobile station 13 at the timing (YES route in step C1) at which data is transmitted to the intermittent power-on type mobile station 13 acting as a power-saving station (from step C2 to step C3 via YES route).

When all pieces of transmission data in the transmission information included in the beacon signal cannot be transmitted according to the transmission acknowledgement signal transmitted from an intermittent power-on type mobile station 13 (NO route in step C4), the data transmission processing unit 42 transmits the transmission data until the maximum extension time exceeds after completion of a data receivable period (from step C5 to step C3 via NO route).

Hence, the data transmission processing unit 42 functions as overtime transmitting means that transmits data within a predetermined time after completion of the data receive-ready period when the data included in transmission information cannot be transmitted during the data receive-ready period.

Figure 19:
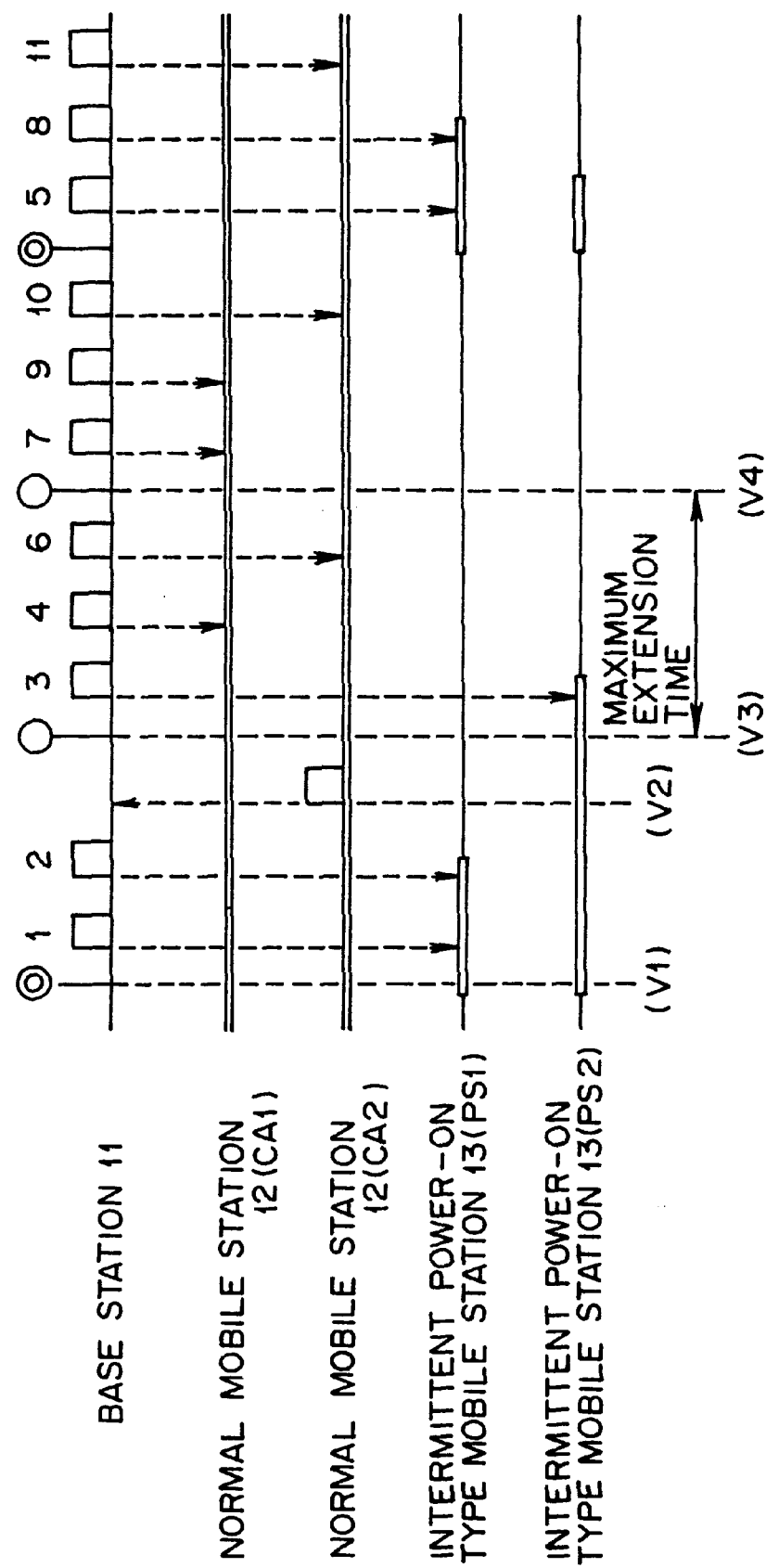
FIG. 19 is a timechart used for explaining the third signal transmit/receive mode of a radio communications system according to an embodiment of the present invention.

For example, as shown with the time (v1) of the timechart in FIG. 19, when the data "3" to be previously transmitted to the intermittent power-on type mobile station 13 during a data receive-ready period (refer to the time (v1) to the time (v3)) cannot be transmitted because of an occurrence of up-stream data transmitted from a normal mobile station 12 to the base station 11, it can be transmitted by delaying the transmission period by a predetermined time (refer to the maximum extension time, the time (v3) to the time (v4)).

When the base station 11 cannot transmit transmission data beyond the maximum extension time, data addressed to a normal mobile station 12 acting as a normal station is subjected to a transmission process (from step C5 to step C6 via YES route). Thus, the transmission data addressed to the intermittent power-on type mobile station 13 which cannot be transmitted can be again transmitted at the transmission timing of data addressed to the next intermittent power-on mobile station 13.

When all pieces of transmission data included in the transmission information can be transmitted prior to a lapse of the maximum extension time (YES route in step C4) and the timing does not exceed the data receive-ready period, the same data transmission process as the above-mentioned process can be performed to other intermittent power-on intermittent mobile station 13 (from step C7 to step C2 via NO route).

Furthermore, when the timing exceeds the data receive-ready period, the data transmission process can be performed to the normal mobile station 12 (from step C7 to step C6 via YES route).

Figure 18:
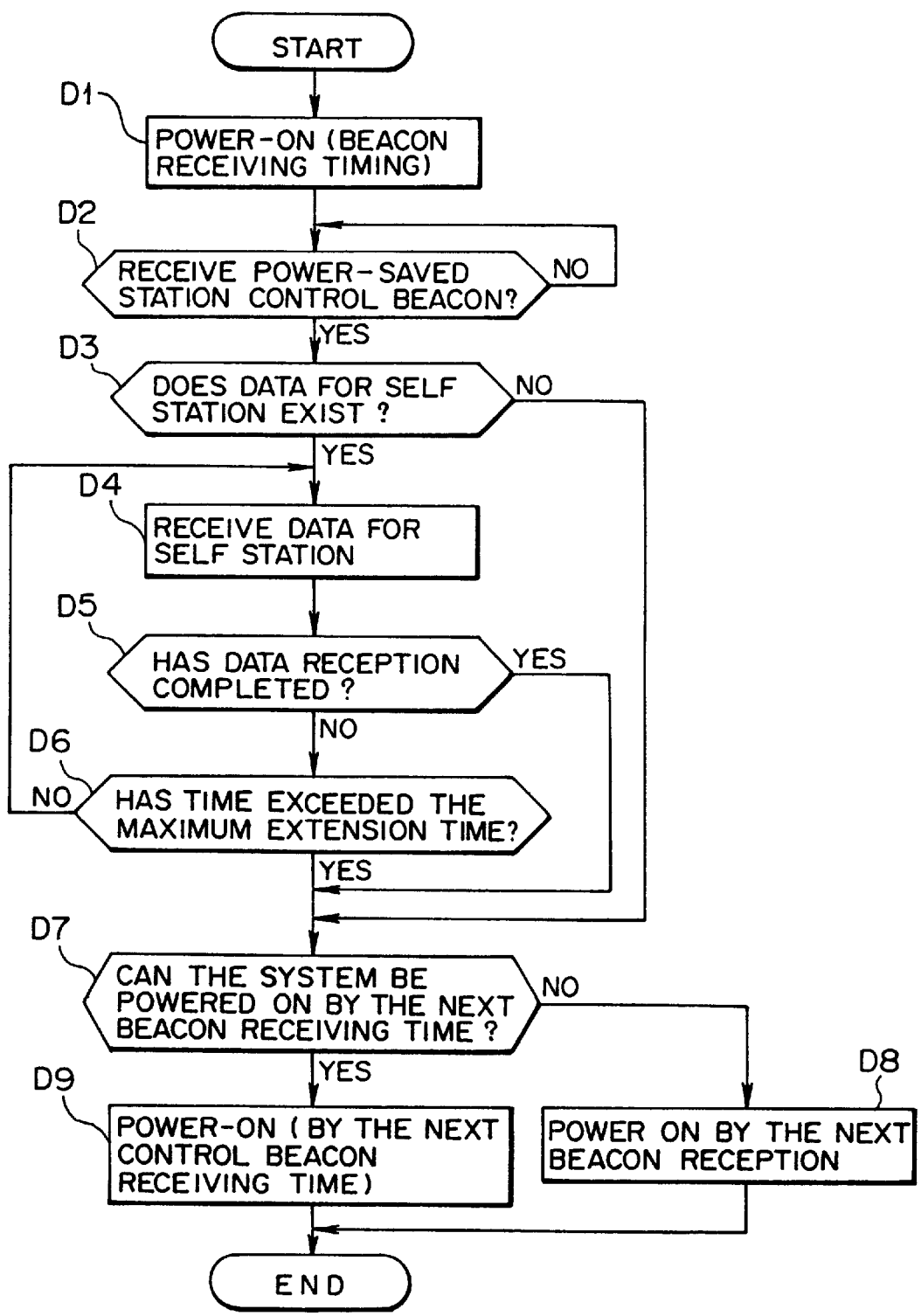
FIG. 18 is a flowchart used for explaining the first signal transmit/receive mode of a radio communications system according to an embodiment of the present invention.

In response to the beacon signal transmitted from the beacon transmission processing unit 41 in the base station 11, the intermittent power-on mobile station 13 operates as shown with the flowchart in FIG. 18.

That is, after being powered on at the beacon receiving timing under control of the power control unit 76 (step D1), the intermittent power-on type mobile station 13 receives a beacon signal for the intermittent power-on type mobile station 13 (step D2).

The control beacon analyzing unit 71a in the intermittent power-on type mobile station 13 analyzes a beacon signal according to transmission information included in a received beacon signal and receives data for a self station transmitted at the following data transmission timing when the beacon signal includes data for the self station (step D3 to step D4 via YES route).

When the intermittent power-on type mobile station 13 cannot receive data for itself included in transmission information even after a lapse of a data receive-ready period (NO route in step D5), the power control unit 76 maintains its powered-on state after a lapse of the data receiving period, thus waiting for the data until the maximum extension time (step D6 to step D4 via YES route).

Hence, the base station 11 has the function of power supply control means that is previously reported of transmission information regarding data to be transmitted from the base station 11 during a data receive-ready period and sustains the powered-on state when data included in the transmission information is not received during the data receive-ready period, thus extending the data receive-ready period by a predetermined time.

For example, as shown with the time (v1) of the timechart in FIG. 19, when the data "3" to be previously received by the intermittent power-on type mobile station 13 during a data receive-ready period (refer to the time (v1) to the time (v3) cannot be received because of an occurrence of up-stream data transmitted from a normal mobile station 12 to the base station 11, it can be transmitted by delaying the reception period by a predetermined time (refer to the maximum extension time, the time (v3) to the time (v4)).

When all pieces of transmission data included in transmission information can be received prior to a lapse of the maximum extension time (YES route in step D5), a transmission acknowledgement signal is transmitted from the ACK transmission processing unit 62 to the base station 11.

Moreover, when all pieces of transmission data included in transmission information cannot be received even after the maximum extension time has elapsed, data addressed to the self station which cannot be received can be again transmitted at the receiving timing of data for the next intermittent power-on mobile station 13.

Thereafter, when all pieces of transmission data included in transmission information cannot be received prior to or even after a lapse of the maximum extension period, the power control unit 76 controls the on/off control of the power supply, based on the period until the next beacon receive timing.

That is, after a power-off operation at a current time, the power control unit 76 sustains the power off-state until the next beacon receive timing (from step D7 to step D8 via YES route) when the power-on operation can be performed at the time at which the next beacon is received but sustains the power-off state until the next beacon receiving time when the power-on operation cannot be performed at the time at which the next beacon is received (step D9).

Hence, the power supplying operation can be halted at the time when all pieces of transmission data included in transmission information are received within a predetermined period after completion of data receive-ready time.

As described above, in the radio communications system according to the present embodiment, the base station 11 reports previously transmission information regarding data to be transmitted to an intermittent power-on type mobile station 13 to the intermittent power-on type mobile station 13 and then transmits the data within a predetermined period after the data receive-ready period when data included in the transmission information cannot be transmitted during a data receive-ready period. At the same time, the intermittent power-on type mobile station 13 can sustain the powered-on state when data included in transmission information previously reported from the base station 11 is not received during the data receive-ready period, thus extending the data receive-ready period by a predetermined time. Hence, the electrical power for the intermittent power-on type mobile station 13 in a receiving state can be effectively consumed. The power consumption of the intermittent power-on type mobile station 13 in a power-saving mode can be reduced while the transmission throughput transmitted from the base station 11 to the intermittent power-on type mobile station 13 can be improved. Moreover there is the advantage in that the load in the case where the base station 11 buffers data transmitted to the intermittent power-on mobile station 13 can be reduced.

A fourth signal transmit/receive mode in a radio communications system according to this embodiment is described below:

In the radio LAN 10 acting as a radio communications system according to the present embodiment, signals between the base station 11 and the mobile stations 12 and 13 can be exchanged in the fourth signal transmit/receive mode, as follows:

That is, the emanation interval of a beacon signal varies to the intermittent power-on type mobile station 13 according to the amount of transmission data (the transmission request amount produced to the intermittent power-on type mobile station 13) transmitted from the base station 11 to the intermittent power-on type mobile station 13. The intermittent power-on type mobile station 13 varies the beacon signal receiving timing shifted to the powered-on state at emanation intervals.

Figure 20:
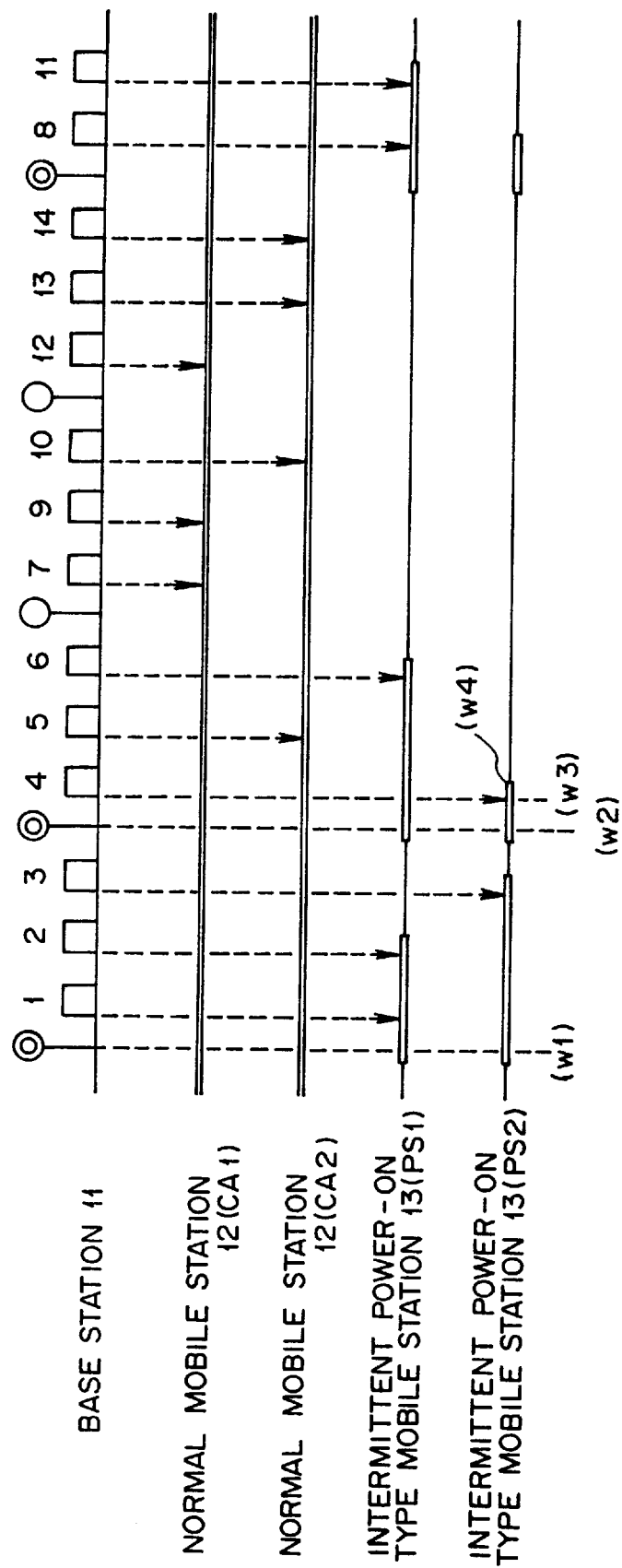
FIG. 20 is a timechart used for explaining the third signal transmit/receive mode of a radio communications system according to an embodiment of the present invention.

For example, at the time (w1) of the timechart shown in FIG. 20, when the base station 11 receives four transmission requests to the intermittent power-on type mobile stations 13 (two pieces of data "1" and "2" to the intermittent power-on mobile station (PS1) 13 and data "3" and "4" to the intermittent power-on mobile station (PS2) 13), the amount of transmission data to the intermittent power-on mobile station 13 on the receiving side is great. Hence, the intermittent power-on type mobile station 13 on the receiving side can receive during one data receive-ready period.

In other words, data "1" to "3" regarding the first three transmission requests can be transmitted during one data receive-ready period. However, the remaining data "4" is transmitted during a data receive-ready period after a beacon signal transmission of the next intermittent power-on type mobile station 13 (refer to the time (w3)).

In contrast, the beacon transmission processing unit 41 in the base station 11 narrows the emanation interval of a beacon transmission signal when the transmission data amount increases. The emanation interval of a beacon signal is widened when the transmission data amount decreases.

In concrete, in the transmission operation, the beacon signal "⊙" for the intermittent power-on type mobile station 13 transmitted at the time (w1) includes information representing that the beacon signal to be transmitted at the next beacon transmission timing (refer to the time (w2)) is the beacon signal "○" for the intermittent power-on type mobile station 13.

Thus, the power control means 76 in the intermittent power-on type mobile station 13 controls so as to turn on the power at the next beacon signal transmission timing in the base station 11, thus speeding up the transmission timing of the data "4" which cannot be transmitted during one data receive-ready period.

Hence, the above-mentioned beacon transmission processing unit 41 has the function of beacon signal emanation interval varying means that narrows the emanation interval according to the transmission data amount to the intermittent power-on type mobile station 13 as the transmission data amount increases and widens the emanation interval according to the transmission data amount to the intermittent power-on type mobile station 13 as the transmission data amount decreases.

As shown with the time (w4) in FIG. 20, when the intermittent power-on type mobile station (PS2) 13 receives data "4" from the base station 11, the power control unit 76 turns off the power because no data to be received later, so that the power consumption can be reduced.

As described above, in the radio communications system according to the present embodiment, the base station 11 varies the emanation interval of a beacon signal to the intermittent power-on type mobile station 13 according to the transmission data amount transmitted to an intermittent power-on type mobile station 13. At the same time, the intermittent power-on type mobile station 13 can vary the beacon signal receiving timing shifted to the powered-on state according to the emanation interval. As a result, the power consumption of the intermittent power-on type mobile station 13 can be optimally balanced to the throughput transmitted from the base station 11 to the intermittent power-on type mobile station 13, according to the transmission data amount transmitted from the base station 11 to an intermittent power-on type mobile station 13.

In the fourth signal transmission receiving mode, when the transmission data amount increases, the emanation interval of a beacon signal is narrowed by transmitting continuously the beacon signal for the intermittent power-on type mobile station 13. However, according to the present embodiment, the beacon signal for the intermittent power-on type mobile station 13 can be transmitted once per two beacon signal timings. When the transmission data amount decreases, the beacon signal for the intermittent power-on type mobile station 13 can be transmitted once per at least four beacon transmission timings.

In the above-mentioned embodiments, the case where the present invention is applied to the radio LAN 10 acting as a radio communications system has been described in detail. However, the present invention should not be limited only to the above-mentioned embodiments. The present invention is applicable to other radio communications systems.

In such a case, other radio communications system may include an intermittent power-on type mobile station that shifts to a powered-on state in synchronous with receiving timing of a beacon signal, with a constant period after a beacon signal reception being a data receive-ready period, and a base station that emanates regularly a beacon signal to the intermittent power-on type mobile station to communicate to an intermittent power-on type mobile station under control of the intermittent power-on type mobile station by radio.

What is claimed is:

1. A radio communication system comprising:

an intermittent power-on type mobile station for shifting to a power-on state synchronously with a received timing of a beacon signal, with a fixed period of time after the beacon signal has been received defined as a data receive-ready period; and a base station for emanating successive beacon signals to said intermittent power-on type mobile station and transmitting data to said intermittent power-on type mobile station by radio while said intermittent power-on type mobile station is ready to receive data from said station as a result of control by the individual beacon signal from said base station;

said base station being operable to transmit data to the intermittent power-on type mobile station in preference to a normal mobile station assuming a normally power-on state without any need to shorten an interval of occurrence of said beacon signal if data to be transmitted to said intermittent power-on type mobile station exists during said data receive-ready period of said intermittent power-on type mobile station.

2. A radio communications system comprising:

an intermittent power-on type mobile station for shifting to a power-on state synchronously with a received timing of a beacon signal, with a fixed period of time after the beacon signal has been received being defined as a data receive-ready period; and a base station for emanating successive beacon signals to said intermittent power-on type mobile station and transmitting data to said intermittent power-on type mobile station by radio while said intermittent power-on type mobile station is ready to receive data from said base station as a result of control by the individual beacon signal from said base station;

said base station taking the initiative, if said data is to be transmitted continuously beyond said data receive-ready period of said intermittent power-on type mobile station, to originally report to said intermittent power-on mobile station, as time extension information, that data must be received beyond said data receive-ready period;

said intermittent power-on type mobile station being responsive to said time extension information from said base station to sustain its power-on state beyond said receive-ready period until all pieces of data transmitted continuously from said base station are received.

3. A radio communications system comprising:

an intermittent power-on type mobile station for shifting to a power-on state synchronously with a received timing of a beacon signal, with a fixed period of time after the beacon signal has been received being defined as a data receive-ready period; and a base station for emanating successive beacon signals to said intermittent power-on type mobile station and transmitting data to said intermittent power-on type mobile station by radio while said intermittent power-on type mobile station is ready to receive data from said base station as a result of control by the individual beacon signal from said base station;

said base station taking the initiative to originally report to said intermittent power-on type mobile station of transmission information regarding data to be transmitted to said intermittent power-on type station during the data receive-ready period, and also operable to transit said data within a predetermined period of time after the lapse of said data receive-ready period if part of pieces of data included in said transmission information has been left untransmitted during said data receive-ready period;

said intermittent power-on type mobile station being operable to sustain its power-on state when data includes said transmission data previously reported from said base station, and then operable to extend said data receive-ready period by said predetermined period of time.

4. The radio communications system according to claim 3, wherein said intermittent power-on type mobile station shifts to its power-off state at the time when all pieces of data included in said transmission information have been received within said predetermined period of time after the lapse of said data receive-ready period.

5. A base station for a radio communications system which accommodates an intermittent power-on type mobile station and a normal mobile station and in which said base station emanates successive beacon signals to the intermittent power-on type mobile station and transmits data to the intermittent power-on type mobile station by radio while the intermittent power-on type mobile station the radio communications system is ready to receive data from said base station as a result of control by the individual beacon signal, said intermittent power-on type mobile station being operable to shift to its power-on state synchronously with a received timing of said beacon signal, with a fixed period of time after reception of said beacon signal being defined as a data receive-ready period, wherein said base station comprises priority transmitting means for transmitting said data in preference to the normal mobile station assuming a normally powered-on state if said data to be transmitted to said intermittent power-on type mobile station exists during said data receive-ready period.

6. A base station for a radio communications system which accommodates an intermittent power-on type mobile station and in which said base station emanates successive beacon signals to the intermittent power-on type mobile station and transmits data to the intermittent power-on type mobile station by radio while said intermittent power-on mobile station is ready to receive data from said base station as a result of control by the individual beacon signal, the intermittent power-on type mobile station being operable to shift to its power-on state synchronously with a received timing of said beacon signal, with a fixed period of time after reception of said beacon signal being defined as a data receive-ready period, wherein said base station comprises time extension reporting means for, if data is to be transmitted continuously beyond said data receive-ready period of said intermittent power-on type mobile station, originally reporting to the intermittent power-on type mobile station, as time extension information that data must be received beyond said data receive-ready period.

7. A base station for a radio communications system which accommodates an intermittent power-on type mobile station and in which said base station emanates successive beacon signals to the intermittent power-on type mobile station transmits data to the intermittent power-on type mobile station by radio while said intermittent power-on type mobile station is ready to receive data from said base station, as a result of control by the individual beacon signal, the intermittent power-on type mobile station being operable to shift to its power-on state synchronously with a received timing of said beacon signal, with a fixed period of time after reception of said beacon signal being defined as a data receive-ready period, said base station comprising:

transmission information reporting means for originally reporting to the intermittent power-on type mobile station of transmission data regarding data to be transmitted to the intermittent power-on type mobile station, during said data receive-ready period and overtime transmitting means for transmitting said data within a predetermined period of time after the lapse of said data receive-ready period if part of pieces of data included in said transmission information has been left untransmitted during said data receive-ready period.

8. An intermittent power-on type mobile station for a radio communications system in which a base station emanates successive beacon signals to said intermittent power-on type mobile station and in which said intermittent power-on type mobile station shifts to its power-on state synchronously with a received timing of the individual beacon signal, with a fixed period after reception of said beacon signal being defined as a data receive-ready period, wherein said intermittent power-on type mobile station includes power supply control means, responsive to time extension information originally emanated by the base station and regards that data must be received the base station beyond said data receive-ready period, for sustaining its power-on state beyond said data receive-ready period to extend said data receive-ready period until all pieces of data continuously transmitted from said base station have been received.

9. An intermittent power-on type mobile station for a radio communications system in which a base station emanates successive beacon signals to said intermittent power-on type mobile station and in which said intermittent power-on type mobile station shifts to its power-on state synchronously with a received timing the individual beacon signal, with a fixed period after reception of said beacon signal being defined as a data receive-ready period, wherein said intermittent power-on type mobile station includes power supply control means, responsive to transmission information originally reported by the base station during said data receive-ready period, for sustaining its power-on state to extend said data receive-ready period by a predetermined period of time if part of pieces of data included in said transmission information has been left unreceived during said data receive-ready period.

10. The intermittent power-on type mobile station according to claim 9, wherein said power supply control means discontinues its power supply operation at the time when all pieces of data included in said transmission data have been received within said predetermined period of time after the lapse of said data receive-ready period.

* * * * *

(12) EX PARTE REEXAMINATION CERTIFICATE (8164th)
United States Patent
Adachi

(10) Number: US 6,018,642 C1
(45) Certificate Issued: Apr. 19, 2011

(54) RADIO COMMUNICATIONS SYSTEM, BASE STATION FOR RADIO COMMUNICATIONS SYSTEM, AND INTERMITTENT POWER-ON TYPE MOBILE STATION

(75) Inventor: Hideo Adachi, Yokohama (JP)

(73) Assignee: Fujitsu Limited, Nakahara-Ku, Kawasaki-Shi, Kanagawa (JP)

Reexamination Request:
No. 90/010,554, May 26, 2009

Reexamination Certificate for:
Patent No.: 6,018,642
Issued: Jan. 25, 2000
Appl. No.: 08/658,865
Filed: May 31, 1996

(30) Foreign Application Priority Data

Dec. 8, 1995 (JP) ............................................. 7-320704

(51) Int. Cl.
*H04L 12/28* (2006.01)

(52) U.S. Cl. .................. 340/7.33; 370/311; 455/517; 455/561; 455/574; 455/70

(58) Field of Classification Search ........................ None
See application file for complete search history.

(56) References Cited

U.S. PATENT DOCUMENTS

| | | | |
|---|---|---|---|
| 4,449,248 A | 5/1984 | Leslie | |
| 5,109,530 A | 4/1992 | Stengel | |
| 5,175,870 A | 12/1992 | Mabey et al. | |
| 5,539,925 A | 7/1996 | Yli-Kotila et al. | |
| 5,560,021 A | 9/1996 | Vook et al. | |
| 5,625,882 A | 4/1997 | Vook | |
| 5,881,101 A | 3/1999 | Furman | |
| 5,940,771 A | 8/1999 | Gollnick | |
| 6,192,230 B1 | 2/2001 | van Bokhorst | |
| 6,469,993 B1 | 10/2002 | Seo et al. | |

FOREIGN PATENT DOCUMENTS

| | | |
|---|---|---|
| EP | 0 615 364 A1 | 9/1994 |
| JP | 6-112876 A | 4/1994 |
| JP | 6-232798 A | 8/1994 |
| JP | 8-195754 A | 7/1996 |
| JP | 9-135201 A | 5/1997 |

OTHER PUBLICATIONS

Diepstraten, W. et al., (Jul. 1993). "Distributed Access WMAC Synchronization and Power Management Mechanisms", IEEE, DOC: IEEE P802.11-93/95.
Ennis, G. (Mar. 1994). *Wireless MAC Foundation MAC Protocol Tutorial presentation for the 802.11 PHY subgroup*, IEEE P802.11-94/57.
IEEE (May 10, 1995). Wireless LAN Medium Access Control (MAC) and Physical Layer (PHY) Specifications, (Draft Standard IEEE 802.11 P802.11D1.1), 23 pages.
IEEE (Jul. 28, 1995). Wireless LAN Medium Access Control (MAC) and Physical Layer (PHY) Specifications, (Draft Standard IEEE 802.11 P802.11D1.3), 338 pages.
The Institute of Electrical and Electronic Engineers, IEEE Std 802.11 2007, ISBN 0738156566 SS95708, New York, New York.

*Primary Examiner* — Lynne H. Browne

(57) ABSTRACT

A radio communications system such as a radio local area network including a base station and mobile stations. The radio communications system includes an intermittent power-on type mobile station for shifting automatically to a power-on state synchronously with a received timing of a beacon signal, with a fixed period of time after the beacon signal has been received being a data receive-ready period; and a base station for emanating a beacon signal to the intermittent power-on type mobile station and communicating with the intermittent power-on type mobile station by radio while the intermittent power-on type mobile station is controlled. The base station preferentially transmits data to a normal mobile station in a normally power-on state when the data to be transmitted to the intermittent power-on type mobile station exits during the data receive-ready period of the intermittent power-on type mobile station. The radio communications system can realize improved throughput and power-saving.

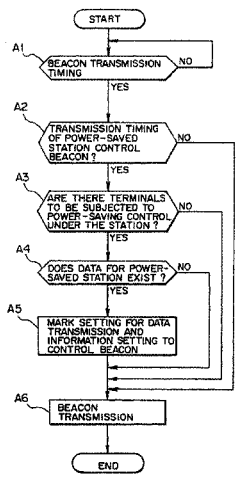

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 2, 6 and 8 is confirmed.

Claims 1, 3-5, 7, 9 and 10 were not reexamined.

\* \* \* \* \*